(12) United States Patent
Abhulimen et al.

(10) Patent No.: US 6,970,808 B2
(45) Date of Patent: Nov. 29, 2005

(54) REALTIME COMPUTER ASSISTED LEAK DETECTION/LOCATION REPORTING AND INVENTORY LOSS MONITORING SYSTEM OF PIPELINE NETWORK SYSTEMS

(75) Inventors: Kingsley E. Abhulimen, 566 Rockland St., Westbury, NY (US) 11590; Alfred A. Susu, Lagos (NG)

(73) Assignee: Kingsley E. Abhulimen, Westbury, NY (US)

( * ) Notice: Subject to any disclaimer, the term of this patent is extended or adjusted under 35 U.S.C. 154(b) by 0 days.

(21) Appl. No.: 10/834,804

(22) Filed: Apr. 29, 2004

(65) Prior Publication Data

US 2005/0246112 A1     Nov. 3, 2005

(51) Int. Cl.⁷ .................. G21C 17/017; G01F 1/66; G01M 3/04; G01M 3/00
(52) U.S. Cl. ................ 702/185; 73/40.5 A; 73/40.5 R; 702/51
(58) Field of Search .............................. 702/50, 51, 55, 702/100, 114, 185, 186; 73/40.5 A, 40.5 R, 73/861.24; 210/85; 340/853.3

(56) References Cited

U.S. PATENT DOCUMENTS

| | | | |
|---|---|---|---|
| 4,361,030 A | * | 11/1982 | Heide ...................... 73/40.5 R |
| 5,548,530 A | | 8/1996 | Baumoel |
| 6,356,205 B1 | | 3/2002 | Salvo et al. |
| 6,405,135 B1 | | 6/2002 | Adriany et al. |
| 6,444,119 B1 | | 9/2002 | Mains, Jr. |
| 6,526,807 B1 | | 3/2003 | Doumit et al. |
| 2002/0124633 A1 | | 9/2002 | Yang et al. |
| 2002/0134140 A1 | | 9/2002 | Baumoel |

* cited by examiner

Primary Examiner—Michael Nghiem
Assistant Examiner—John Le
(74) Attorney, Agent, or Firm—Keusey, Tutunjian & Bitetto, P.C.

(57) ABSTRACT

There is provided a method for detecting and locating leaks in a pipeline network in real-time. A flow model is provided that characterizes flow behavior for at least one of steady and unsteady states respectively corresponding to an absence and a presence of model leaks in the pipeline network, the flow model including a leaking factor $k_L$. A deterministic model is provided to evaluate at least one of a leak status and a no leak status relating to the pipeline network using deterministic criteria. The deterministic criteria is based on a Liapunov Stability Theory. A deviation matrix is constructed based on the flow model and the deterministic model to generate eigenvalues. A leak alarm is generated when at least one of the eigenvalues is less than a predetermined value.

9 Claims, 29 Drawing Sheets

REALTIME COMPUTER ASSISTED LEAK DETECTION/LOCATION REPORTING AND INVENTORY LOSS MONITORING SYSTEM OF PIPELINE NETWORK SYSTEMS

BACKGROUND OF THE INVENTION

1. Field of the Invention

The present invention generally relates to detection and monitoring systems and, more particularly, to a real-time method and system for detecting leaks and inventory loss and for managing information corresponding thereto. The present invention may be employed with respect to, for example, gas and liquid pipeline network systems, storage tanks of process systems, blood vessels and stroke management.

2. Background of the Invention

Most conventional pipeline leak detection systems have failed in terms of response time, sensitivity, robustness and cost. Pipeline leaks can be detected by observation of the external effects of the spill, or by monitoring and analysis of the internal hydraulics of the pipeline. One of the objectives of a pipeline leak detection system is to alert operators so that the size of the spill can be limited, which argues for speedy detection as well as reliability and sensitivity.

In choosing the optimum model, a leak detection system that provides continuous monitoring of pressures, temperatures, and flow at points along the pipeline, supported by automated analysis of the data is most ideal. A conventional leak detection system is based on several models. One of the oldest techniques, over short analysis is based on the application of the principle of conservation of mass using flow meters to establish whether the flow in the pipeline is balanced by the flow out. The existence of flow transients makes this method for leak detection a slow response technique, since it is necessary to either average flow over a long time period to filter out the effect of line pack changes due to transients. For long transmission pipelines, the response time is usually very long. Such long response time is unsatisfactory, and has the additional problem of significant data loss during the averaging time. This model cannot detect leak location, but can be used to establish commodity release and the volume spilled. Another model for leak detection is the Pressure Point Analysis. The basic idea of this model is that a leak initiation event produces a pressure drop that propagates in both directions from the leak site. Pressure changes can be detected with great sensitivity, and so it should be possible to detect the onset of small leaks. Pressure surges or operational changes can mask leaks if they are positive or cause false alarms if they are negative. It is applicable to pipelines operating under steady flow.

The dynamic model based real time leak detection system compares measurements collected by the Supervisory Control & Data Acquisition (SCADA) System, with a simulated model of the flow in the pipeline in lock step with actual operations. The results of simulation can be used to provide accurate line pack changes that, in combination with measured flow, give fast volume response. They can be used to support deviation analysis such as pressure drop or flow deviations, by correcting for changes not caused by leaks. This dynamic system model can be used to establish a leak location through a set of statistical and probability mathematical models. The major draw back to this model is the cost of installing the software and instrumentation. Another draw back is the incidence of false alarms due to fluctuating threshold setting, model complexity and poor instrumentation. Automatic threshold adjustment to optimize the sensitivity/false alarm/response time trade off and various means of coping with data problems would reduce the incidence of false alarms, but significantly increase the cost. Other leak detection system models are wave alert, acoustic and statistical pipeline leak detection models.

Most conventional systems are computer assisted to conform to Application Programming Interface (API) documentation on leak detection, which mandate all operators of U.S. hazardous Liquid pipelines to engage in pipeline leak detection known as Computational Pipeline Monitoring (CPM). For example, CPM must use, by reference the document API 11.30, the newest technology for pipeline monitoring for leaks. API 11.30 defines CPM as "an algorithmic monitoring tool" as it allows the pipeline controller to respond to a pipeline-operating anomaly that may indicate product release. As a system therefore, CPM is computer based.

As can be appreciated, because of inherent shortcomings of previous leak detection system models, a need exists for better models, methods, and systems for leak detection that have a fast response time and produce no false alarms, and that are obtained at optimal cost preferably in range of conventional leak detection systems. Also, the model should be capable of being employed with any kind of fluid system, locating leaks precisely, detecting small leaks, and predicting and assessing inventory loss precisely in any pipeline network system.

Current thresholds of false alarms reported by operators of most commonly used conventional leak detection systems create serious concerns for the need of more robust and optimal leak detection systems. Moreover, the slow level of response time and false alarm thresholds have led to serious revenue loss translating in millions of dollars in some cases, resulting from commodity, operational and asset lost, couple with penalties for spillage to the environment and lost man hours. There is a need for a more robust leak detection system that is error proof and has a fast response feedback time, which is enabled by a web based interactive platform for expert leak detection that reduces the feed back time between detection and control.

U.S. Pat. No. 5,548,530 (hereinafter the "'530 patent"), entitled "High-Precision Leak Detector and Locator", issued on Aug. 20, 1996, the disclosure of which is incorporated by reference herein, describes a method and apparatus for leak detection which involves creating site stations at the beginning and the end of a pipeline, and dividing each pipeline segment into a plurality of hypothetical pipeline sections, each section having the same nominal volume, measuring the liquid flow into the first section and determining a volume of liquid that has passed the first section and determining a volume of liquid that has passed the first site station for a defined period, measuring the temperature of the liquid entering the first section of the first site station, measuring the liquid flow out of the last pipeline section of the segment and determining a volume of liquid that has passed the second site station for a defined period, measuring the temperature of the liquid leaving the last section at the second site stations, measuring the ambient temperature of the pipeline at the first station or that representative of the topography of the segment, measuring the ambient temperature of the pipeline at the second site station or that representative of the topography of the segment. The invention of the '530 patent computes changes in one segment relative to the penultimate, correcting the difference in measured volume of all sections during the defined period, comparing the corrected difference in measured volume between the first and second site stations and generating an alarm signal if the difference exceeds the threshold level.

U.S. Published Patent Application No. 2002/0124633 (hereinafter the "'633 application"), entitled "Method and Apparatus for Pattern Match Filtering for Real Time Acoustic Pipeline Leak Detection and Location", filed on Sep. 12, 2002, the disclosure of which is incorporated by reference herein, describes a pattern match filter that includes using previously recorded leak profiles that benchmark pressure waveforms suggesting leaks against previous data. At site processes located at multiple points along a pipeline, a series of previously recorded signature leak profiles are continuously compared in real-time against pipeline pressure signals. The '633 application acknowledges that multiple transients on the pipeline from normal operating procedures can produce pressure disturbances (similar to an expansion wave generated by leak event), which are located on the monitored segment of pipeline and thus cause false leak alarms. The '633 application further acknowledge that previous techniques such as moving average, repetitive filter, dynamic threshold and band pass filters have only been successful in removing a certain type of noise, but has little effect on other types of transient noise such as pumps, compressors and valve operation, which produce signals with amplitudes similar to the amplitudes of signals produced by leaks, which has led to a high false alarm rate and reduced sensitivity. The '633 application further states that knowing the exact time of arrival of the expansion pressure wave at each monitor is critical for precisely locating the leak on the pipeline. Precise measurement by each monitor of arrival times is critical. However, the low frequency content of the expansion pressure wave produces a wavelength from a few hundred meters to 100,000 meters or more. Due to the length of the wave front and other factors, an uncertainty in the time tag between monitors occur, which in the past has limited leak location accuracy to typically +/−500 or more meters out of 10,000 meters. This has led to the inability to accurately locate leaks. Furthermore, this system uses a real-time acoustic pipeline leak detection technique that requires placing permanent monitors on a pipeline for detecting expansion pressure waves associated with a sudden breakdown in pressure boundary due to a rupture in a pipe wall. The '633 application discloses that in the past it was the amplitude of the signal that was of concern. The source of the pressure waves was located between the monitors by recording the times when the expansion pressure waves arrived at the monitors. Using these times ($t_2$ and $t_1$) and knowing the fluid sound velocity (V) and the length of the pipe between the monitors (D) the leak event could be located. Denoting the leak event location (distance from sensors number I) as "X", the leak event location is computed as follows:

$$X = D/2 + V(t_2 - t_1)/2 \qquad (1)$$

In U.S. Published Patent Application 2002/0134140, entitled "Leak Locator For Pipe Systems", filed on Sep. 26, 2002, the disclosure of which is incorporated by reference herein, describes a system and method for determining a time of occurrence of a pressure wave in a pipe that provides a first sonic transducer and a second sonic transducer at each of a plurality of site locations along a pipe, with sonic waves being generated through a pipe wall at a particular rate. At each of the plurality of site locations, the sonic waves travel from the first sonic transducer to the second sonic transducer through a liquid flow in the pipe, with a measure of travel time set for the sonic waves. The measure is compared to each of the successive travel times for the sonic waves as the sonic waves arrive at respective second transducers. A string of counts is output at each second transducer. Each count includes a first count value if a present sonic wave has a travel time that is late as compared to the measure. A time of occurrence of the pressure wave is determined based on a reference clock when the string of counts includes a string of first count values longer than a threshold value. The time of occurrence of a pressure transient is indicated by a first count in the string of first count values.

As can be appreciated, a need exists for a dynamic facile, voice and virtual automated system for the representation, sorting and management of information about leaks and inventory loss in pipeline network systems through assessable web based stations.

Accordingly, it would be desirable and highly advantageous to have a real-time, computer-assisted, leak detection/location reporting and inventory loss monitoring system that overcomes the above-identified problems of the prior art.

SUMMARY OF THE INVENTION

The problems stated above, as well as other related problems of the prior art, are solved by the present invention, which is directed towards a software based leak detection system for pipeline leak detection and commodity release assessment, monitoring and control. The present invention may be implemented by a computer assisted feedback system that achieves a fast response time, has no false alarm thresholds and has robust attributes, and which can analyze any kind of pipeline network configuration and fluid system.

The present invention is an online, web-based leak detection and inventory loss information management system that allows users the flexibility to assess information and interact with the pipeline network system to track leaks or inventory loss in any pipeline system, enhanced by use of security features like enhanced web-based encryption capability with a backup failed server platform.

The present invention can detect, assess and track leaks and inventory loss in pipeline network systems and can trigger an alarm to operators or users through a fax\modem, a web modem or voice modem in any part of the world accurately with a response time of less than a minute.

A computer host server is coupled online for intercommunication to a plurality of stations or clients from which respective authorized users each have a browser-based interface with the computer host server.

Leak detection in accordance with the present invention completely eliminates false alarms associated with instrument error or error generated by complexity of model describing the flow behavior.

The present invention at least differs from conventional leak detection systems in that the present invention does not rely on models describing flow behavior or instrument accuracy, as it only measures the density, temperature, flow and pressure at sensor instruments, and uses data collected in real-time from the sensors to construct a Jacobean matrix of flow parameters, from where the Eigenvalues can be generated. The leak detection system according to the present invention locates leaks through a feedback mechanism that allows the time lag and the particular sonic velocity to be measured, from which a location log chart profile can be constructed.

The present invention provides a leak detection apparatus that is web-based, interactive and proactive, which allows operators and users to set up an information monitoring system that is proactive in leak detection and inventory loss assessment, with the capability to locate leaks in the pipeline system to avert the consequences of pipeline failure and environmental degradation.

The present invention embodies a database apparatus for collecting and recording data on a pipeline system, flow behavior, leak and inventory loss status and transposing these data into a plurality of information scenarios which can be provided, for example, by fax, e-mail or a voice modem mode at the user's discretion.

The database apparatus forms part of an active subsystem of the integrated leak detection and inventory loss apparatus of the present invention. The database apparatus also includes source codes that manage entry, storage and retrieval of data associated with leaks and inventory loss. Furthermore, the apparatus includes a database information section, a file management section, and a report generating section.

One of the many advantages of the present invention is that characteristic eigenvalues generated from a matrix of deviation provide users with a fast response time, zero false alarm thresholds and greater flexibility in managing the information flow and wider accessibility through a web-based internet apparatus, interfaced with the pipeline system, to announce and locate leaks and inventory loss status.

Another of the many advantages of the present invention is that all information can be managed in one central database assessable by a plurality of user database stations.

According to an aspect of present invention, there is provided a method for detecting and locating leaks in a pipeline network in real-time. A flow model is provided that characterizes flow behavior for at least one of steady and unsteady states respectively corresponding to an absence and a presence of model leaks in the pipeline network, the flow model including a leaking factor kL. A deterministic model is provided to evaluate at least one of a leak status and a no leak status relating to the pipeline network using deterministic criteria. The deterministic criteria is based on a Liapunov Stability Theory. A deviation matrix is constructed based on the flow model and the deterministic model to generate eigenvalues. A leak alarm is generated when at least one of the eigenvalues is less than a predetermined value.

These and other aspects, features the advantages of the present invention which will become apparent from the following detailed description of preferred embodiments, which is to be read in connection with the accompanying drawings.

DETAILED DESCRIPTION OF THE INVENTION

Figure 1:
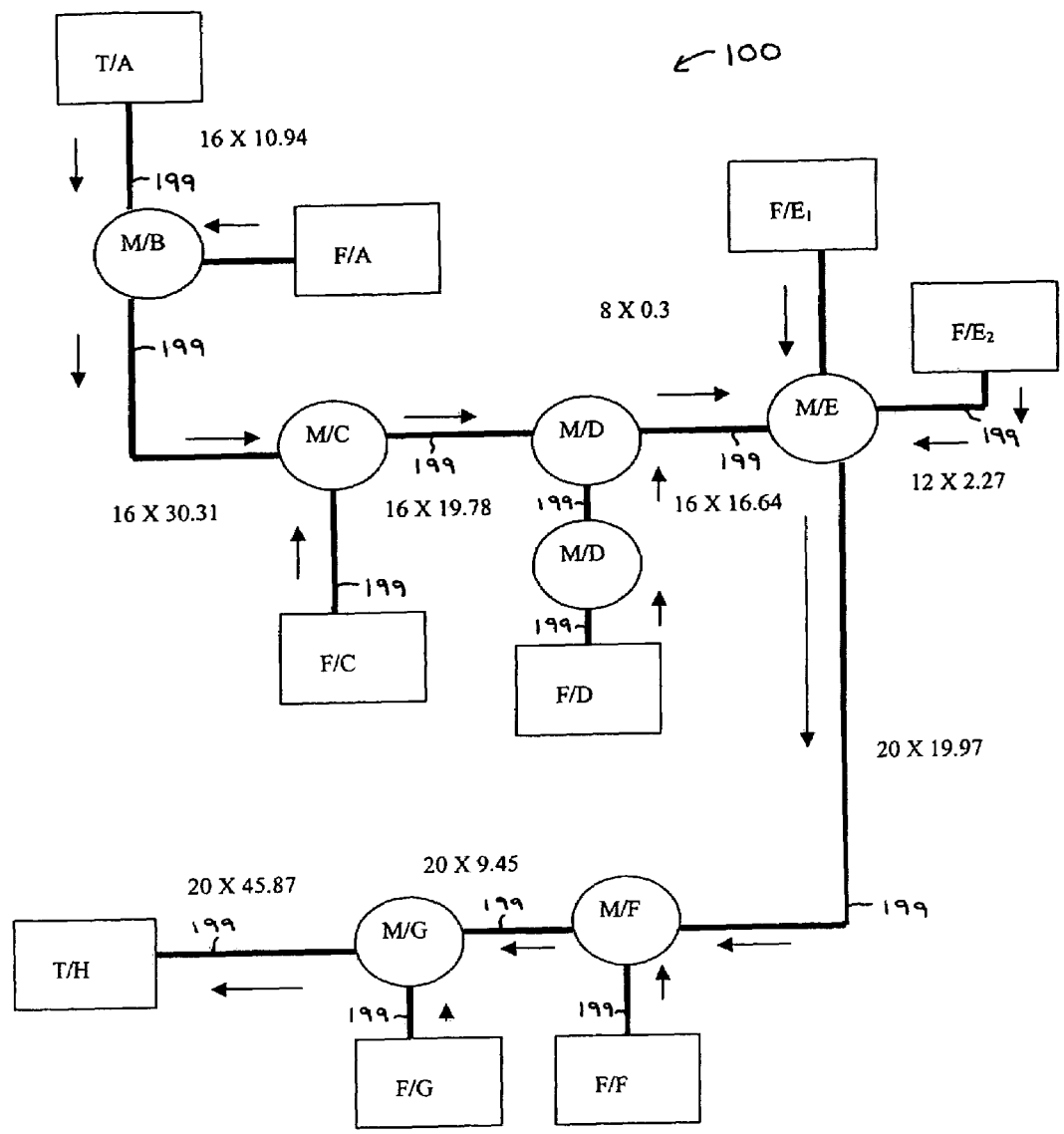
FIG. 1 is a schematic flow diagram illustrating a typical pipeline network system 100 to which the present invention may be applied, according to an illustrative embodiment of the present invention.

The present invention is directed to a Real-Time Computer Assisted Leak Detection/Location Reporting and Inventory Loss Monitoring System. It is to be appreciated that the present invention may be employed for any type of pipeline system, including single pipeline systems and complex pipeline systems. The pipeline system may be used to transports, e.g., liquids and/or gases. The liquids may include, but are limited to, petroleum-based liquids, water, blood, and so forth.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Advantageously, the present invention provides a leak detection/location reporting and inventory loss monitoring system and method for detecting, locating and reporting leaks in a pipeline network system on a real-time basis. The leak detection system and method are based on a new model for detecting and tracking leaks in pipeline flow system. The model uses the theory of Liapunov stability criteria to establish a basis for establishing a leak or no leak in the pipeline. A mathematical model, which incorporates a leaking factor $k_L$, is used to describe the behavior of the flow system if there are leaks in the pipelines. A Bayesian probability model is used to establish the certainty of leaks in the pipeline, while a deterministic model is used to track the location of leaks in the pipeline segment of interest. An advanced mesh model based on nodal analysis and Kirchoff's Laws is applied to complex pipeline network systems to analyze flow behavior with leaks. Using a modified hardy cross method with the model for leak detection, a simulation computer program was developed for detecting leaks in complex network system. The Leak detection architecture incorporates a model that interface with controllers, Supervisory Control and Data Acquisition System (SCADA) and sensor devices to provide a system for detecting and locating leaks in single or complex gas and liquid pipeline system.

It is to be appreciated that the phrases "Jacobean matrix", "stability matrix", and "deviation matrix" are used interchangeably herein to refer to a matrix used to generate eigenvalues. While all equivalent in their overall function (e.g., to generate eigenvalues), the stability matrix is referred to herein when the pipeline network to which the present invention is applied is in a steady state, while the deviation matrix is referred to herein when that pipeline is in an unsteady state. These phrases and the derivations of the matrices will be described in further detail herein below.

The present invention provides a method for locating leaks in a pipeline system for simple and complex gas or a liquid pipeline system. The method involves placing permanent monitors on the pipeline that detects expansion pressure waves associated with a sudden breakdown in the pressure boundary due to a rupture in the pipe wall as well as the measurement of the flow velocity associated with fluid movement.

The method of the present invention uses measurements of the propagating pressure and the flow velocity in series, as well as the temperature of the fluid (in the case of gas, specific volume and enthalpy are used), to create a Jacobean matrix of flow from these measurements, where evaluation of the matrix generates a solution vector of eigenvalues (pressure and velocity) specific to the fluid system at the time of measurement.

The leak is located by calculating the fluid sonic velocity at the upstream and downstream sensors of the pipeline from where the leak is located using the average of the product of sonic velocity and time lag of deviation at the upstream and downstream sides. Hence, $$D_{lups}=V\times(T\,dev-Tnor)_{lups} \quad (2)$$

$$D_{dups}=V\times(T\,dev-Tnor)_{dups} \quad (3)$$

Leak Located $DL=(D_{lups}+D_{dups})/2$ (4)

The sonic velocity is given by equation (5) as follows:

$$c = \sqrt{\frac{1}{\left(\left(\frac{1}{K_{eff}}\right)+\left(\frac{DE_s}{t_w}\right)\right)\rho}} \quad (5)$$

According to one illustrative embodiment of the present invention, the present invention relates to a method and apparatus for detecting and locating leaks in single and complex gas and liquid pipeline networks on a real-time basis, and includes the steps of: providing a flow model that includes a leaking factor $k_L$ to describe flow behavior for steady and unsteady states of leaking pipelines; providing a deterministic model to evaluate a leak or no leak status using deterministic criteria based on the Liapunov stability theory; constructing a deviation or Jacobean matrix based on measured flow data and flow data generated from derived flow model to generate eigenvalues; providing a probability and statistical model based on a Bayesian Probability Model for constructing a random table that certifies the presence of an actual leak in the network; and generating a leak alarm when an eigenvalue is less than a predetermined value and the leak is certified.

Additional steps include tracking the location of leaks using the deterministic model which includes; using sonic velocity measurements together with time lag between first measurement of a no leak and leak status.

According to an illustrative embodiment of the present invention, constructing the Jacobean matrix to generate eigenvalues involves; forming a Jacobean matrix to evaluate the eigenvalues, the Jacobean matrix includes a Jacobean differential of deviation, calculated as follows:

which expresses pressure and velocity values at one of the sensor and a node point as:

$$\zeta_{i+1j}=H\omega_{i,j} \quad (6)$$

wherein:

$$\Omega_{ij}=\begin{bmatrix}\xi_{ij}\\ \eta_{ij}\\ \gamma_{ij}\end{bmatrix}\quad \xi_{i+1j}=\begin{bmatrix}\xi_{i+1j}\\ \eta_{i+1j}\\ \gamma_{i+1j}\end{bmatrix} \quad (7)$$

$$H=\begin{bmatrix}A & B & C\\ D & E & F\\ G & H & I\end{bmatrix}=\begin{bmatrix}(\partial F1/\partial z)ij & (\partial F1/\partial z)ij & (\partial F1/\partial)ij\\ (\partial F2/\partial z)ij & (\partial F2/\partial z)ij & (\partial F2/\partial)ij\\ (\partial F3/\partial z)ij & (\partial F3/\partial z)ij & (\partial F3/\partial)ij\end{bmatrix}=JF \quad (8)$$

where J is the Jacobean differential of deviation from a stable point as follows:

$$J=\frac{\partial[F_1F_2F_3]}{\partial[VMP]} \quad (9)$$

According to another illustrative embodiment of the present invention, the Jacobean matrix of a gas pipeline flow system includes a Jacobean differential of deviation of gas flow, calculated as follows:

$$\zeta G_{i+1j+1}=H_G\Omega_{Gij} \quad (10)$$

where:

$$H_G=\begin{bmatrix}\left(\frac{\partial F_1}{\partial}\right)_{ij} & \left(\frac{\partial F_1}{\partial}\right)_{ij} & \left(\frac{\partial F_1}{\partial}\right)_{ij} & \left(\frac{\partial F_1}{\partial}\right)_{ij}\\ \left(\frac{\partial F_2}{\partial}\right)_{ij} & \left(\frac{\partial F_2}{\partial}\right)_{ij} & \left(\frac{\partial F_2}{\partial}\right)_{ij} & \left(\frac{\partial F_2}{\partial}\right)_{ij}\\ \left(\frac{\partial F_3}{\partial}\right)_{ij} & \left(\frac{\partial F_3}{\partial}\right)_{ij} & \left(\frac{\partial F_3}{\partial}\right)_{ij} & \left(\frac{\partial F_3}{\partial}\right)_{ij}\\ \left(\frac{\partial F_4}{\partial}\right)_{ij} & \left(\frac{\partial F_4}{\partial}\right)_{ij} & \left(\frac{\partial F_4}{\partial}\right)_{ij} & \left(\frac{\partial F_4}{\partial}\right)_{ij}\end{bmatrix}=J_GF \quad (11)$$

and $$\Omega_G=\begin{bmatrix}\xi ij\\ \gamma ij\\ \eta ij\\ \lambda ij\end{bmatrix}\quad \zeta_G=\begin{bmatrix}\xi i+1j\\ \gamma i+1j\\ \eta i+1j\\ \lambda i+1j\end{bmatrix} \quad (12)$$

$J_G$ is a dimensionless Jacobean differential of deviation of gas flow from stable equilibrium systems expressed as follows:

$$J=\frac{\partial[F_1F_2F_3F_4]}{\partial} \quad (13)]$$

After the constructing step in which the eigenvalue is created, a standard deviation model is generated for assigning a value and classifying a disturbance; and another standard deviation model is calculated to evaluate a width of deviation of a typical flow vector point at time i=0 . . . n, as follows:

$$SD(\lambda_{2ij}) = \sqrt{\sum_{i=0}^{n} \frac{(|\lambda_{2ij}| - 1)^2}{(n-1)}} \quad (15)$$

$$SD(\lambda_{3ij}) = \sqrt{\sum_{i=0}^{n} \frac{(|\lambda_{3ij}| - 1)^2}{(n-1)}} \quad (16)$$

wherein a standard deviation close to zero indicates a small leak, and as the standard deviation increases a larger leak is indicated, and wherein $|\lambda_{1ij}|, |\lambda_{2ij}|, |\lambda_{3ij}|$ respectively represent the absolute values of eigenvalues for velocity, mass and pressure at a particular time and pipeline node point.

According to an illustrative embodiment of the present invention, for a complex pipeline network (e.g., a pipeline network having a plurality of pipelines included therein), the present invention proceeds by decomposing the complex pipeline network into a mesh of networks; and analyzing the mesh of networks using nodal analysis and Kirchoff's Laws.

By modifying Hardy Cross program codes to handle unsteady state mode the pipeline systems can be completely analyzed for leaks, when flow behavior caused by leak disturbance causes unsteady mode in the flow behavior.

In addition, the present invention may include the following steps: identifying the plurality of loops and nodes within the complex pipeline network; locating the central node from which all loops emanate; identifying the minimum number of loops from the central node, and determining if all nodes are contained within a loop, if a node is not contained in a loop, drawing arbitrary lines to connect the node to the central node, wherein the loops and lines include sub-networks; and analyzing each sub-network which includes using the modified Hardy Cross program to generate a pressure and velocity profile, for evaluating the pressure drop and leak profile.

The present invention may further include the following steps: using the modified Hardy Cross source program to produce a new version of the program source code to identify a plurality of code coverage tasks for analyzing fluid flow in complex pipeline network system in unsteady states modes, precipitated by leaking points in pipeline network system; generating a persistent unique subprogram code for each of the code coverage tasks; incorporating unique coverage program task for different fluid and network systems into a modified format of the program codes for each code coverage task to produce an instrumented version of the program source code; compiling and linking the instrumented version of the program source code into executable program that identifies a new set of test cases from a plurality of test cases to be run for the code coverage data collection purposes of the code coverage tasks; altering the code coverage database to accommodate one of new, modified and expanded code coverage tasks and the new set of test cases; clearing any code coverage data for the code coverage tasks from the said coverage database; running the executable program with a test case from the identified new set of test cases and collecting code coverage data for the code coverage tasks, until all the test cases have been ran; and updating the code coverage database with the collected coverage data for the non-affected code coverage tasks in database file eliminating the need to run the entire program. Other aspects of the generating step include generating a persistent unique name for each of the code coverage tasks by changing the version indicators in the names of the said codes of coverage tasks.

The present invention may further include a flowchart information apparatus that, in turn, may include the following: (i) a database apparatus for collecting persistent code coverage database interfaced with the SCADA apparatus of manufacture that is linked with the sensor apparatus, a data storage apparatus that stores the code coverage database; and one or more source programs; executed by program codes specific to the coded coverage data collected; dividing the program source code statements of the said system apparatus into a plurality of code coverage tasks; (ii) a threshold apparatus connected to the database, the sensor and the computational apparatus, is used for collecting persistent code coverage threshold associated with transfer and computational errors in sub and main system program codes, generating a unifying codes for tracking errors associated with each processing task for each of the code coverage tasks to eliminate completely errors from the final output results for each test case; and (iii) a microprocessor operationally connected to the database for processing and/or performing the following codes and/or steps: sub program software codes covering boundaries of mathematical & logical program statements incorporated into the main program code for each of the code coverage tasks to produce an instrumented program; compiling and linking the instrumented program into a program executable; identifying a set of test cases from a plurality of test cases to be run for the code processing tasks for the identified set of test cases, running the program executable with a test case from the identified set of test cases and presenting the information about test case and coverage points that are executed into an output file, until all the test cases have been run; and processing the information and producing the output file into code coverage data and populating the code coverage database with the said output for test cases.

The present invention may also include performance and decision apparatus that, in turn, includes: (i) an integral leak detection apparatus that includes source codes for identifying and locating leaks in single pipeline system, where the source codes locate the coordinates of leaks as points in the z-coordinates in a curvilinear (r$\theta$z) cylindrical mesh grid; generating a persistent unique name for each of the code coverage tasks of the plurality of the code coverage tasks for different pipeline system integrated into a mesh of interlocking network of pipeline system located in a rectangular grid; and (ii) a performance/reliability/decision apparatus that includes program codes for checking the certainty of leaks in a pipeline system stored in a matrix, generated by probability and optimization models, wherein the code coverage database includes a matrix array of trials for each test case in the said identified set of test cases and a column for each code coverage tasks of said plurality of code coverage tasks, wherein the decision variables are generated through a series of program codes to decide on the possibility of leaks in the pipeline system, inventory loss, risk assessment, failure and decision modes.

The present invention may further include an output location and alarm apparatus for collecting persistent code coverage data using computer program codes, the computer program including program source code statements to detect leak points, locations, inventory or commodity loss. The present invention may further include the steps of: identifying the computer program for which the code coverage data should be collected; dividing the program source code statements of the computer program into a plurality of code coverage tasks; generating a persistent unique name for each of the code coverage tasks of said plurality of code coverage tasks; generating a persistent unique name for each code of the code coverage tasks of said plurality of code coverage tasks of test cases; incorporating alarm voice and fax modes codes into the computer program source codes, for each variation from normal case, indicating leak detected for each of the coverage tasks to produce an instrumented program; compiling and linking the instrumented program into a program executable; identifying a set of test cases from a plurality of test cases to be run for the code coverage output data collection purposes, creating a code coverage database using the code coverage tasks and the identified set of test cases; running a program executable with a test case from the identified set of test cases, and running an alarm mode codes for deviation from normal case, and writing the information about the test case and the coverage points that are executed into an output file, until all the test cases have been run; and processing the information contained into the output file, making it available to users into code coverage data and populating the code coverage database with said code coverage data.

The present invention may further include or interact with a communication apparatus connecting a SCADA (Supervisor Control and Data Acquisition) apparatus and a host computer server via a network protocol. The communication apparatus may include: modified program Source codes of a distributed control system combined with a Programmable Logic Controller, including a printer function, a memory configured to store information protocols from a plurality of protocols, including at least encoding definition protocol, the protocol manager, the history log information protocol, setup user information protocol, and communicating destination address information, the encoding definition protocol describing an encoding source program method of the security management of information and the plurality of task functions; and a transmitter device, run by the source program, for transmitting the encoded information in the form of encrypted waveforms.

The encoding definition protocol includes management task protocols that create a data encrypted waveform from a plurality of encrypted data waveforms that are created by unique encryption model source codes in the apparatus to enhance security of transported information in a communication pipe network.

According to an illustrative embodiment of the present invention, the host computer server is connected through one of a WAN and LAN network device to the communication apparatus with at least a printer function. The host computer server may include: management protocol program source codes to decode test case encrypted data waveforms from a plurality of encrypted data waveform emanating from the communication apparatus, wherein a decoder decodes the encoded encrypted data waveform from a plurality of data waveform; a request protocol to manage print job and history log information, user setup, destination address information, program source codes for receiving decoded data information from a plurality of waveforms, compiling data information, running the leak detection and inventory management program codes for particular test cases from plurality of test cases, and alarm code ran as voice and fax modem, that can present a fax document to various users.

The present invention may further include hardware or software (e.g., program codes) for information management to be controlled using identifier protocol codes that classify waveform types as follows: inserting into the main program source code sub-program codes that manage a system protocol for organizing input and output information data in a searchable spreadsheet format which is interface with a dynamic query database system, where the output information is accessible to a chart device for plotting characteristic plots of output information, and is managed and controlled by a user interface with adequate access permission to the searchable spreadsheet. Manipulation of the spreadsheet is only limited to the output chart presentation, as the input data information into the spreadsheet is controlled by a dynamic query data base system, while the output chart protocols can be manipulated and modified to provide different visual and numerical formats enabled by user protocols.

According to another illustrative embodiment of the present invention, the present invention may include a computer-assisted leak detection and inventory loss management system for a pipeline network system that includes: a computer host server, a plurality of computer work stations using one of a LAN (Local Area Network) and a WAN (Wide Area Network) operationally coupled to the computer host server from which respective users have an access code in the form of an authorization password code, combined with a voice recognition modem, wherein the computer includes: the leak detection apparatus and a database component, having both dynamic and static features, a SCADA apparatus that interfaced with a Distributed System Controller in phase with a Programming Logic Controller, linked up to a network of sensor work stations, wherein the sensor work stations are situated at upstream and downstream points of pipeline segment.

The present invention may also provide for a graphical user host and user computer system that, in turn, provide both contextual and virtual reality of display flow and leak mode scenarios of typical pipeline flow network system, for user's display screen when a user moves a cursor arrow over and rest it on a button, a voice modem for communication between user and a query database and controller, using voice activated protocols sub program codes.

The present invention also may include built-in-email functionality capabilities using internet e-mail technologies, where e-mail documents can be separately sent or received from the output database automatically to the user and vice-versa, inbuilt internet features to accept bulk mails, inbuilt features to accept voice and fax commands from user or automated device to the control task protocol apparatus.

Other aspects includes a computer-readable medium having computer-readable instructions for performing automated computer based pipeline leak and inventory loss assessment and monitoring on real time basis having minimal or no false alarms thresholds, also comprising a web server inter-communication with browser-enabled user stations, reporting leaks and inventory situation, such as leak occurrence, size and location, inventory loss, assessment and risk to immediate environment, in voice, fax and virtual format.

Other aspects of the present invention include an algorithm for providing expert information from a plurality of source information database port system connected to a centralized database server system, whereas the said technique comprising the steps of: displaying useful information to client user server, providing an expert opinion in fax, voice and virtual format, and identifying alternative paths of control; receiving request from client system protocol and interfacing with the server database, the database storing expert information relating to each port and cross referencing user information.

The present invention may further include a displaying information protocol; comprising program codes that uses a user graphical interface to display plurality of information on the pipeline flow system, flow data, leak situation and inventory loss, combined with a request protocol; comprising sub program codes that uses a user graphical interface to interact between user and database system. Also included are a comparator protocol which cross reference the expert information: comparing user information and communication language of user to expert information stored on the database which includes identification of expert protocols, types of expert protocols, shift timings of expert protocols, communication language of expert protocols, and availability of expert protocols, retrieving available experts protocols based on matching user information with expert information protocols, and sorting the retrievable experts on a prescribed format based on a selection criteria.

The present invention may further include an expert system having an applet implementer that comprises of web based enabled graphical interface for compiling, executing, testing the plurality of application program codes for the expert system, the leak and inventory loss detection apparatus.

FIG. 1 is a schematic flow diagram illustrating a typical pipeline network system 100 to which the present invention may be applied, according to an illustrative embodiment of the present invention. The pipeline network system includes: a tank farms A and H (T/A, H), manifold stations B, C, D, E, F, G (M/B, C, D, E, F, G), flow stations A, C, D, $E_1$, $E_2$, F, G (F/A, C, D, $E_1$, $E_2$, F, G), and pipes 199.

The system 100 illustrated in FIG. 1 represents an abridged section of a studied network loop. The system 100 includes a complex array of trunk lines and tie lines interconnected through a series of manifolds. The manifolds are connected together by adjacent delivery lines or trunk lines. Trunk lines are pipelines 16" and above, which are the distribution system for transporting large volumes of crude oil to the terminal. Delivery lines, which are 8" and 12" pipelines, connect the flow station with an adjacent manifold, from where the oil enters the trunk line distribution system. This pipeline system easily lends itself for modeling as the network breaks down into a system of sub network loops characterized by interconnecting manifold nodes. A matrix equation relating pressure heads at each node and flow distribution in each pipe is solved using a modified Hardy Cross technique which is presented below to analyze the transient network flow system. The pipeline network system considered here transports crude oil from flow stations through a distribution system (delivery and trunk lines) to the terminals. The network is fed by many sources through fixed head nodes from the flow station.

Figure 2:
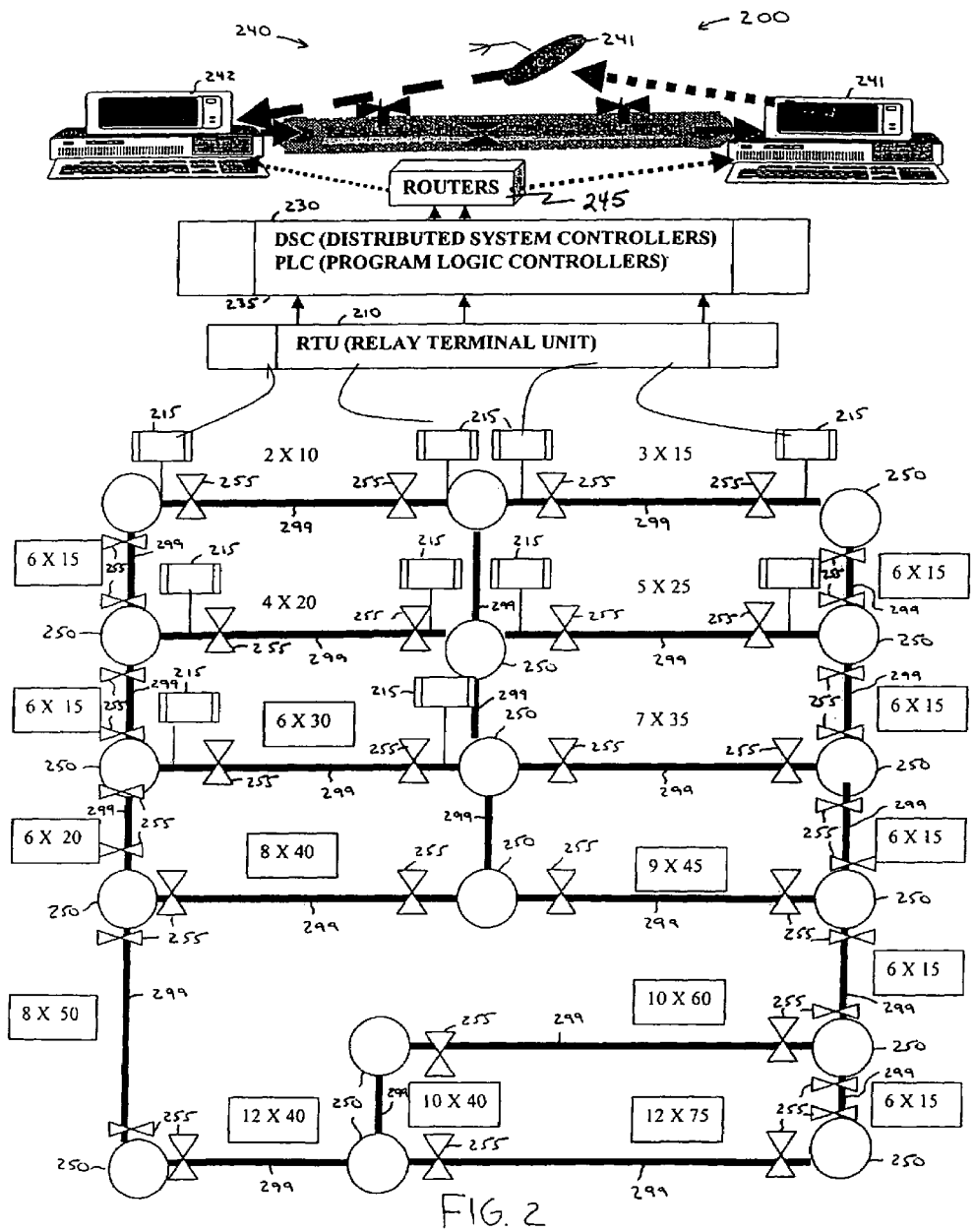
FIG. 2 is a schematic flow diagram illustrating a typical pilot test model 200 to which the present invention may be applied, according to an illustrative embodiment of the present invention.

FIG. 2 is a schematic flow diagram illustrating a typical pilot test model 200 to which the present invention may be applied, according to an illustrative embodiment of the present invention. The pilot test model 200 allows for the evaluation of optimum system requirements, such as, for example, the best configuration and the hierarchy of the systems and subsystems. Such systems include SCADA (Supervisory Control and Data Acquisition) systems (not shown), a Relay Terminal Unit (RTU) 210, sensors 215, leak detection software (not shown), and middle systems such as, for example, a DSC (Distributed System Control) 230 and/or a PLC (Programming Logic Controller) 235, a telemetry system 240, routers 245, manifolds 250, control valves 255, and pipes 299. The telemetry system 240 at least includes a satellite 241, a first computer server 242, and a second computer server 243. The servers 241, 242 are coupled to the routers 245.

In addition, the pilot test model 200 is used to collate characteristic data for different leak situations under different operational conditions. Evaluation of the critical response time, robustness of the software system, reliability and sensitivity of the system shall be analyzed and evaluated. More importantly, the ability of the leak detection system to locate leaks in pipeline system and evaluate the degree of leak is demonstrated using the pilot test model 200.

Figure 3:
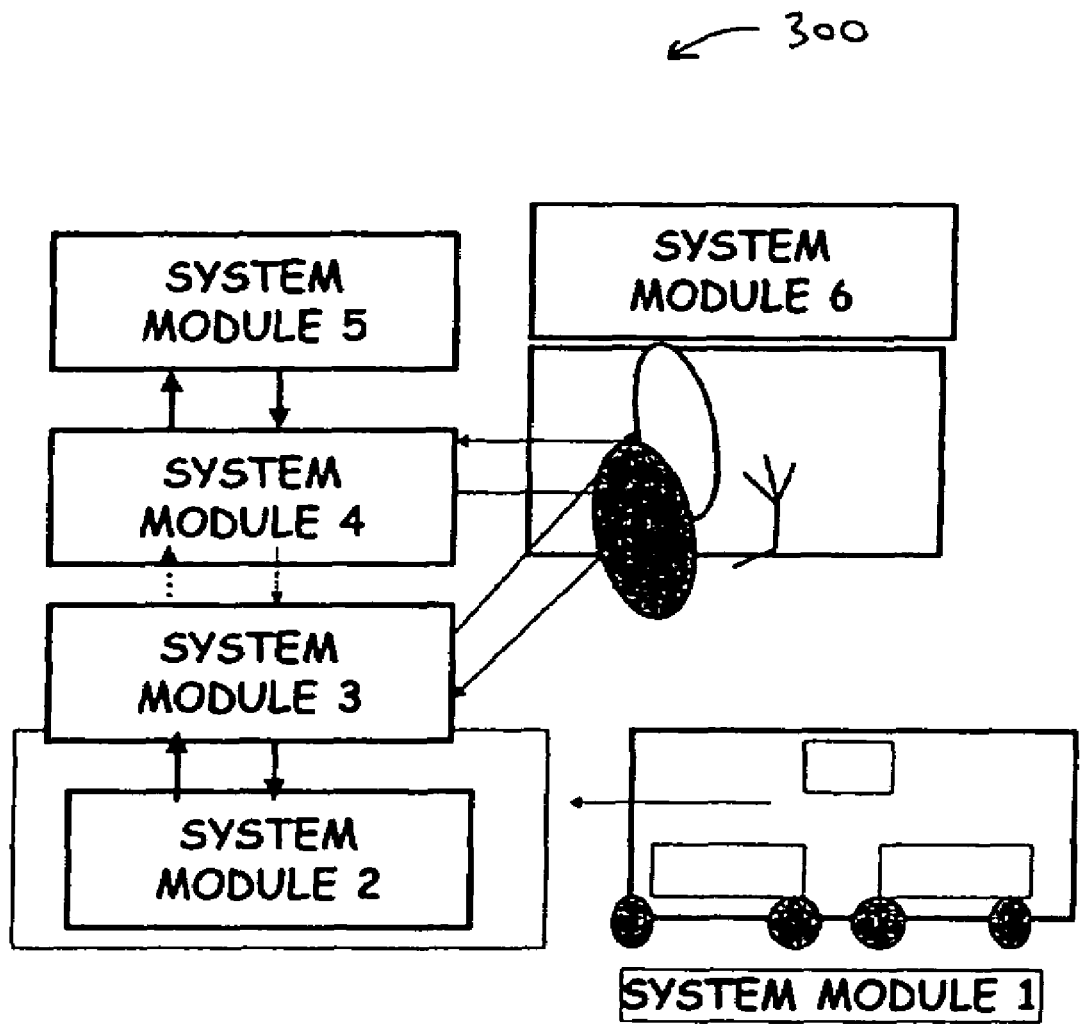
FIG. 3 is a diagram illustrating the hierarchy of a leak detection system 300, according to an illustrative embodiment of the present invention.

FIG. 3 is a diagram illustrating the hierarchy of a leak detection system 300, according to an illustrative embodiment of the present invention. The hierarchy describes the information pathway for a typical pipeline system that could be carrying a commodity such as, for example, a fluid, hydrocarbon liquid or gas. Sensors (System Module 1) measure flow parameters, temperature, pressure and density. System Module 1 further includes the actual pipeline system. The data from the sensors are provided to a Relay Terminal Unit (RTU) (System Module 2) which, in turn, provides the data to Middle Systems (System Module 3) that include SCADA (Supervisory Control and Data Acquisition) software, DSCs (Distributed System Controllers) and PLCs (Programmable Logic Controllers). Moreover, the data is further provided to specialized computer/servers (System Module 4) customized to carry out specialized leak detection and inventory loss monitoring and management with web-based features, and to a telemetry system (System Module 6), which could be, for example, a VSAT system. The control servers (System Module 4) are linked to a host or user computer (System Module 5), which is web based interactive with Internet features. The host or user computer (System Module 5) may be implemented on, but is not limited to, a MICROSOFT Operating System (OS) platform. The specialized computers/servers (System Module 4) may be implemented on, but are not limited to, a Unix Platform.

Figure 4:
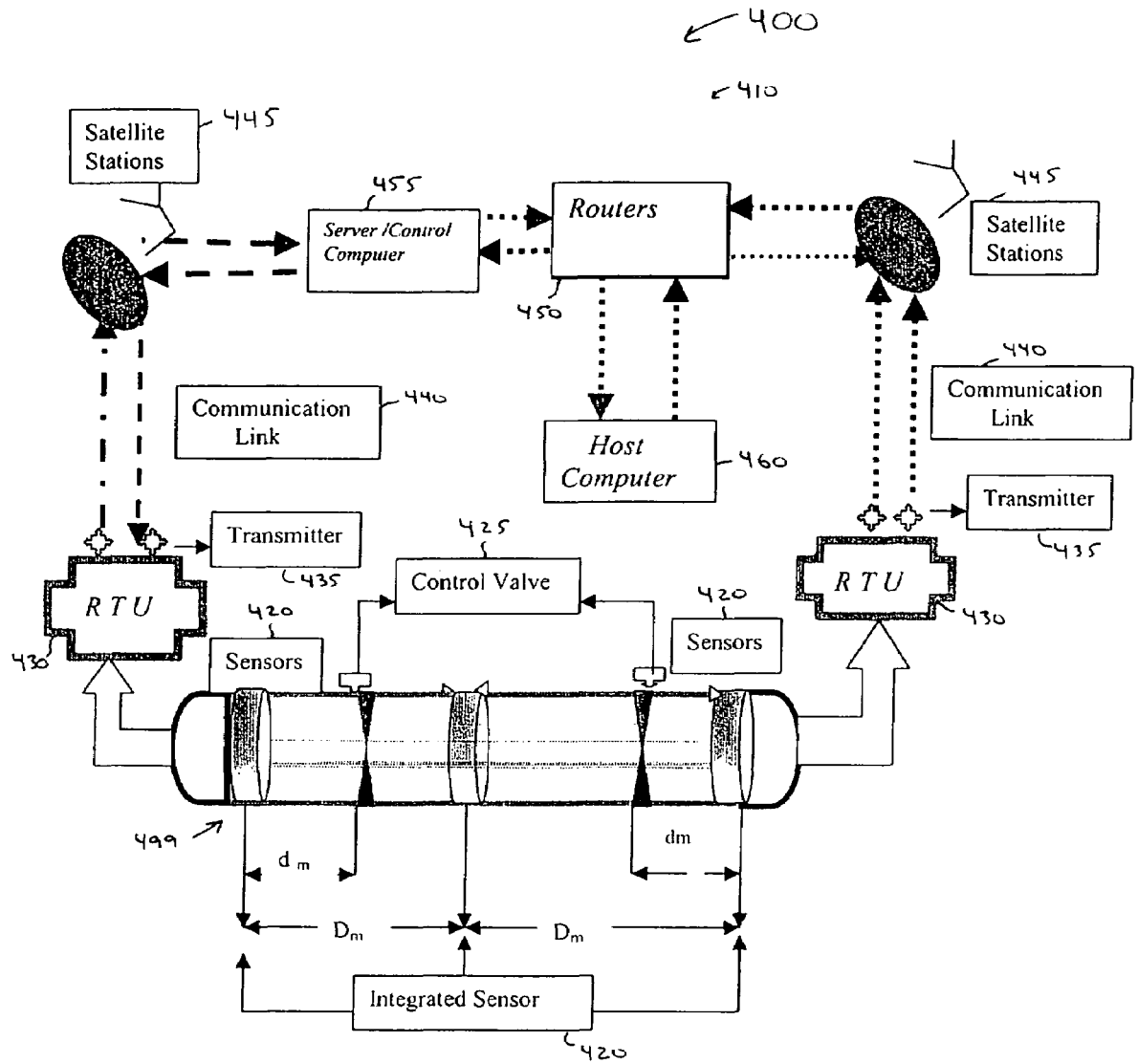
FIG. 4 is a diagram illustrating a configuration of a pipe-leak detection system 400 that includes a communication apparatus 410, according to an illustrative embodiment of the present invention.

FIG. 4 is a diagram illustrating a configuration of a pipe-leak detection system 400 that includes a communication apparatus 410, according to an illustrative embodiment of the present invention. The pipe-leak detection system 400 includes sensors 420 at the upstream and downstream sections of a pipeline and a control valve 425 installed on the pipeline at a predetermined distance dm from the sensor 420. If a sensor 420 is between adjacent sensors 420, then it must be placed at the predetermined distance Dm from the adjacent sensors for optimal performance. A Relay Terminal Unit (RTU) 430 relays information from the sensor 420 to base satellite stations 445 through a transmitter 435 and communication link 440. The base satellite stations 445 transmit data information to specialized servers/control computers 455 via routers 450. In a preferred embodiment of the present invention, the specialized leak detection and inventory loss monitoring and management software is stored within the specialized servers/control computers 455. Preferably, although not necessarily, the specialized servers/control computers 455 are implemented on a Unix Platform, interact with users via a web-based interface, and transfer information through a LAN (Local Area Network) and a WAN (Wide Area Network) to a Host Computer 460.

Figure 5:
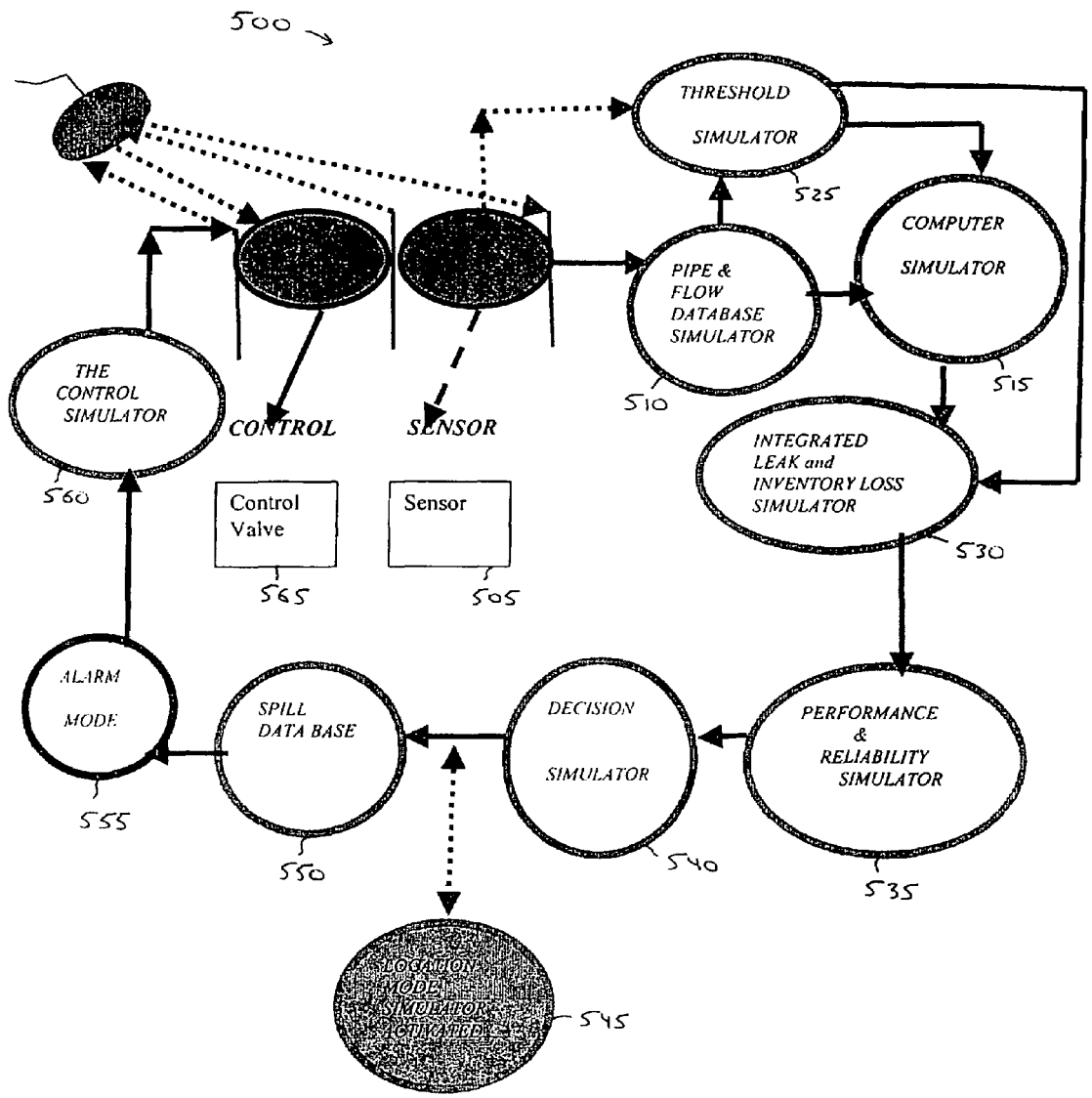
FIG. 5 is a diagram illustrating an integrated leak detection and inventory loss information/database management system 500, according to an illustrative embodiment of the present invention.

FIG. 5 is a diagram illustrating an integrated leak detection and inventory loss information/database management system 500, according to an illustrative embodiment of the present invention. In particular, FIG. 5 illustrates the flow of information in the system 500.

Data from sensors 505 flow into a pipe and flow database simulator 510, and then are transferred to a computer simulator 515 that analyzes the data and executes a computer simulation program. The execution of the computer simulation program is proactively monitored by a threshold simulator 525.

Outputs of the computer simulation program 515 and the threshold simulator 525 are provided to an integrated leak and inventory loss simulator 530 for detecting, locating, and assessing leaks and inventory loss in a network of pipelines. The output of the simulator 530 is provided to a performance and reliability simulator 535, which does a check to ascertain a leak or inventory loss situation. The output of the simulator 535 is provided to a decision simulator 540, which is a source program for providing a user with information for use in making a decision of the leak and inventory loss assessment situation. The output of the simulator 540 may be, but is not limited to, the form of a voice modem, a fax modem, and/or an e-mail, and is provided to operators to allow them to make an informed decision and then take action based on the decision.

Once an assessment of the leak situation is confirmed, a leak location mode simulator 545 is activated to track the position of the leak. All information is stored into a spill database 550, which is linked to the alarm mode 555 that triggers off the alarm. A control simulator 560 is a controller, which sends control signals or information to shut down the control valve 565 when a hazardous and full-bore rupture is observed.

Figure 6:
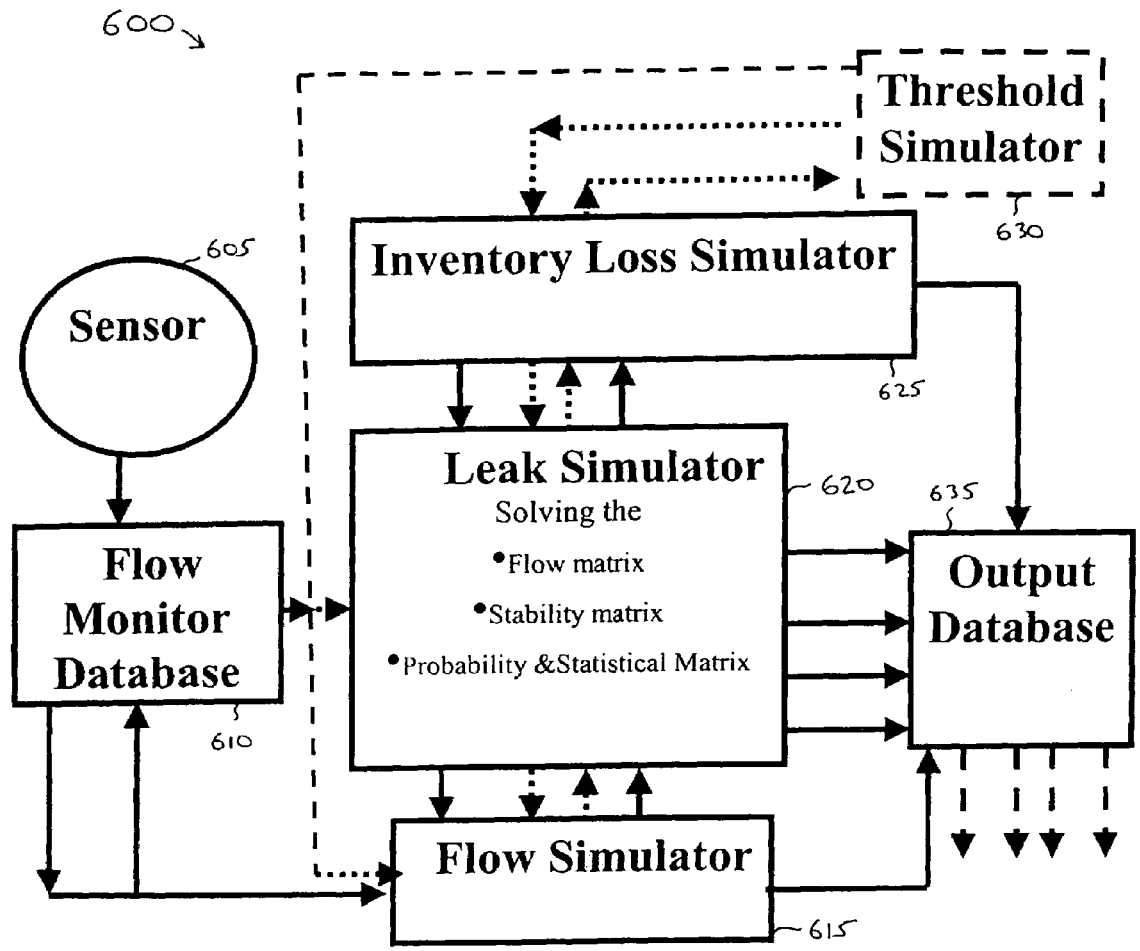
FIG. 6 is a diagram illustrating a leak/inventory loss information database management system 600, according to an illustrative embodiment of the present invention.

FIG. 6 is a diagram illustrating a leak/inventory loss information database management system 600, according to an illustrative embodiment of the present invention. The leak/inventory loss information database management system 600 includes a sensor 605, a flow monitor database 610, a flow simulator 615, a leak simulator 620, an inventory loss simulator 625, a threshold simulator 630, and an output database 635.

The sensor 605 collects data, which is provided to the flow monitor database 610. An output of the flow monitor database 610 is provided to the flow simulator model 615, which performs fluid flow analysis of the fluid system to determine pressure drop and flow velocity. The flow monitor database 610 and the flow simulator 615 are coupled to the leak simulator 620. The leak simulator 620 solves the flow matrix, stability matrix (where the Eigenvalues of the stability function are evaluated), the probability and statistical matrix (which evaluates the certainty of a leak in a pipeline). The leak simulator 620 also allows for the determination of the location of leaks in the pipeline. The inventory loss simulator 625 allows the computer to analyze the inventory loss from the pipeline system and determine the risk of discharge of the fluid commodity in the pipeline to the adjourning surroundings. The threshold simulator 630 allows for the tracking and regulation of all error modes in the system. The output database 635 is implemented on, but is not limited to, for example, a licensed Oracle database platform. The output database 635 manages the inventory loss data and the flow and leak simulator data to generate a set of output data. The output data from the output database 635 is provided in a suitable form relating, but not limited to, a voice modem, a fax modem, a view graph or chart profile, and/or a spreadsheet.

Figure 7:
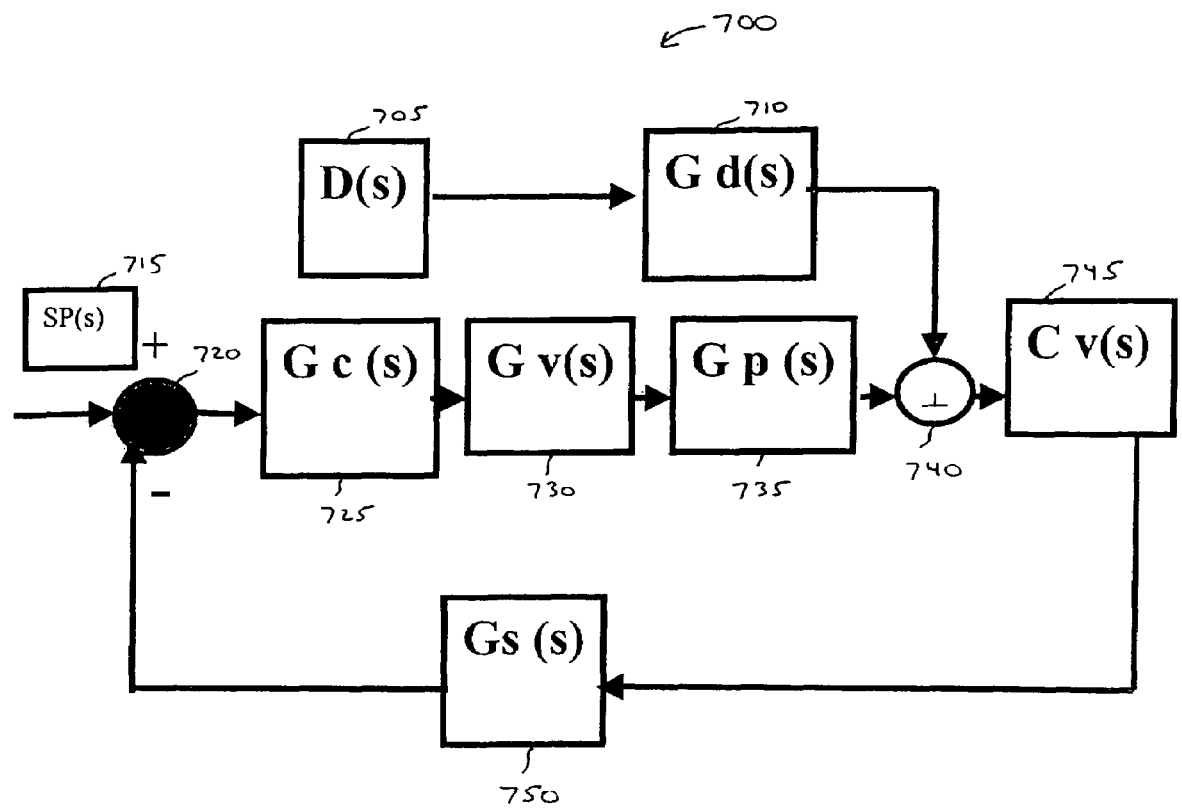
FIG. 7 is a diagram illustrating a feedback control system 700, according to an illustrative embodiment of the present invention.

FIG. 7 is a diagram illustrating a feedback control system 700, according to an illustrative embodiment of the present invention. The feedback control system 700 includes a disturbance mode D(s) 705, a G d(s) 710, a set point SP(s) 715, an arithmetic unit 720, a controller G c(s) 725, a transmission, transducer and valve system G v(s) 730, a process system G p(s) 735, an adder 740, a C v(s) block 745, and a sensor, transducer and transmission system G s(s) 750.

The disturbance mode D(s) represents a leak or inventory loss situation, which is transformed into Gd(s), and converted into a signal. Gp(s) 735 is the process system that is a pipeline transporting fluid. Gc(s) is the controller, which can either be an integral or differential controller. The set point SP(s) 715 is a design set (+) that balances the information signal (−) sent by the sensor Gs (s) 750 to assess the error deviation from a set value caused by a disturbance to determine the level of required control.

Figure 8:
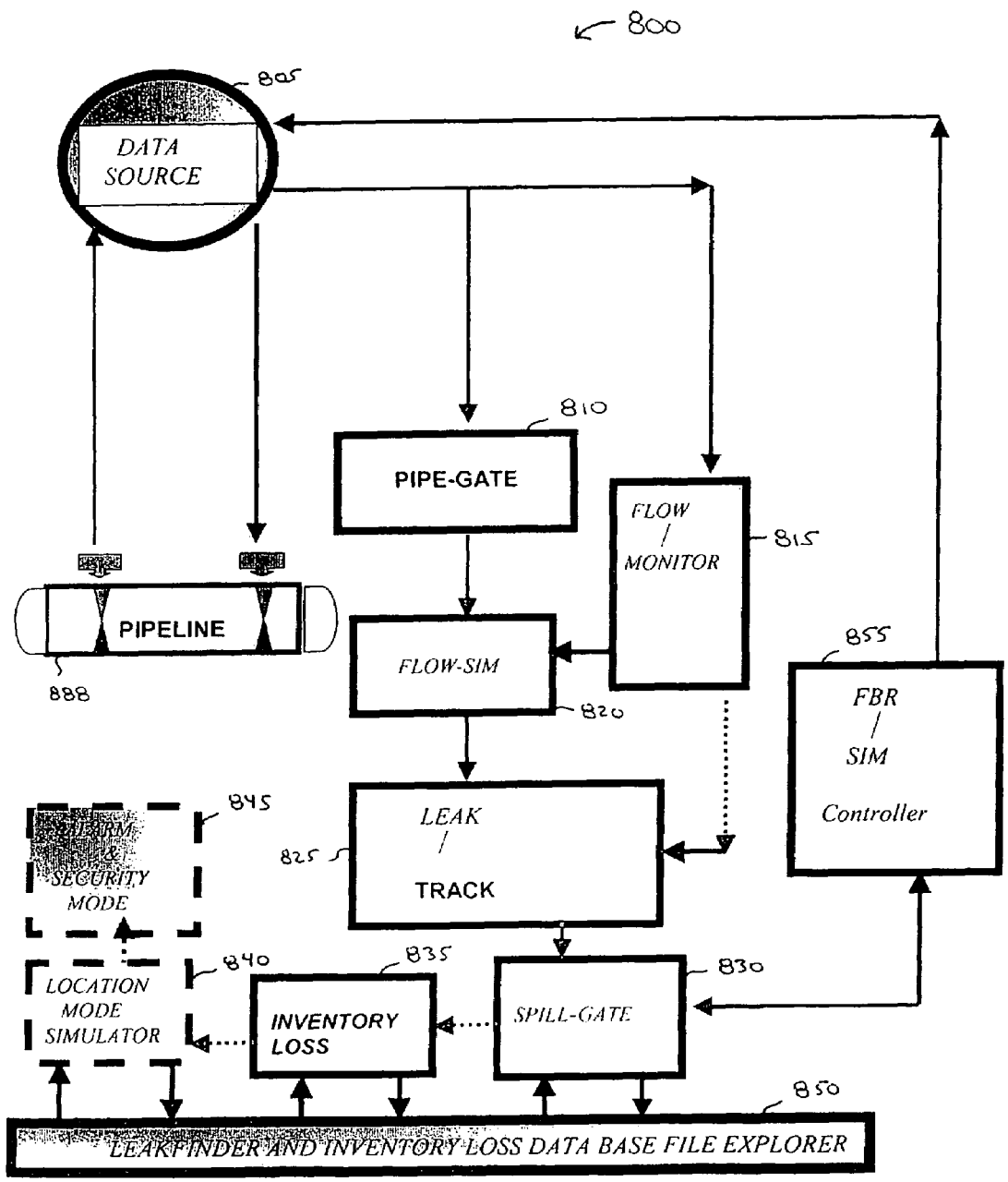
FIG. 8 is a diagram illustrating a software system architecture 800, according to an illustrative embodiment of the present invention.

FIG. 8 is a diagram illustrating a software system architecture 800, according to an illustrative embodiment of the present invention. The architecture 800 shows how the software system modules tie up in an integrated software system.

A data source 805 is linked to a pipe-gate simulator 810. The pipe-gate simulator 810 provides a design flowchart of the pipeline network system showing all manifold points, pipeline type, distance, diameter and specifications, and sensor and valve locations. A flow-monitor 815, which is connected to the pipe-gate simulator 810, keeps track of information data on pressure, flow velocity, density, temperature, and viscosity of the pipeline system 888. A flow-simulator 820, which is connected to the flow-monitor 815 and the pipe-gate simulator 810, does a preliminary simulation based on new models developed for flow in pipeline systems to predict pressure points and velocity points under steady and unsteady state conditions throughout the line of the pipeline. A leak/track simulator 825 locates all the leak points and does a preliminary leak assessment using models developed for leak detection and location. A spill-gate simulator 830 does a preliminary assessment of inventory loss, the risk to the immediate environment, and safety assessment, and sends this information to an inventory loss manager 835. The inventory loss manager 835 performs an inventory loss assessment and control. A location-mode simulator 840 tracks and locates all leaks. An alarm and security mode simulator 845 provides an alarm trigger once an abnormality is observed. All the information is stored in a database file explorer 850, which stores all data and information in, for example, a history chart format or a spreadsheet. In a separate loop, the FBR/SIM Controller 855 is connected between data source 805 and Spill Gate 830.

Figure 9:
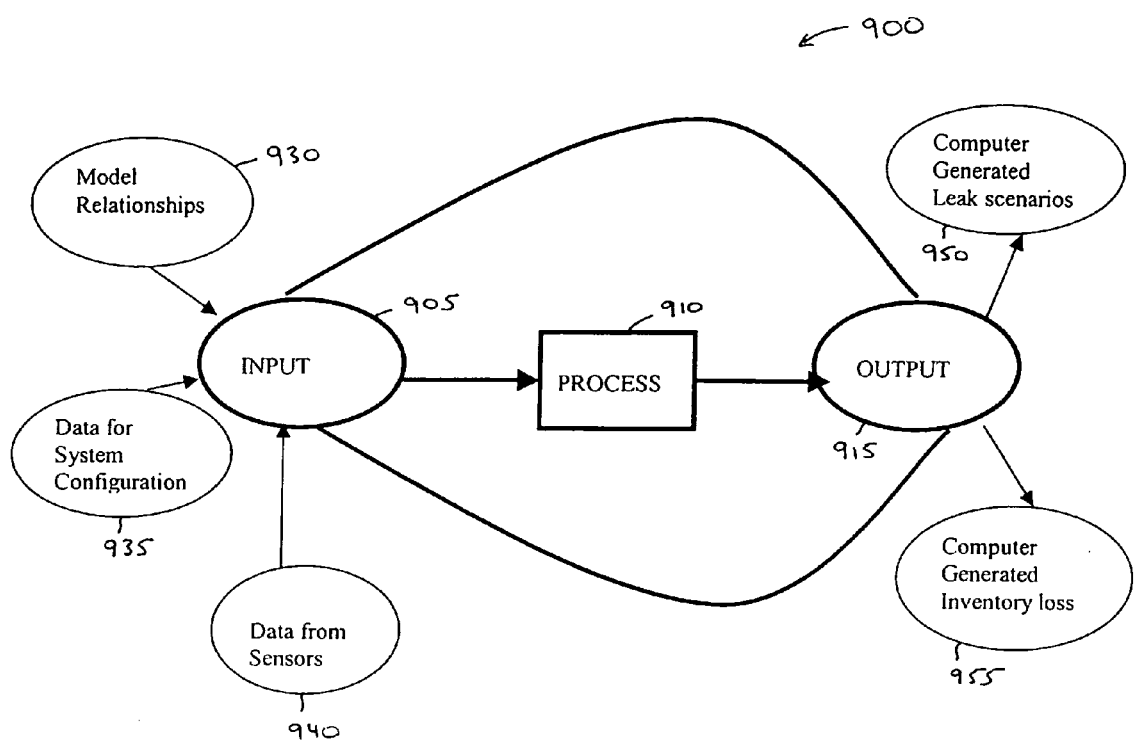
FIG. 9 is a diagram illustrating a leak detection and inventory loss system 900, according to an illustrative embodiment of the present invention.

FIG. 9 is a diagram illustrating a leak detection and inventory loss system 900, according to an illustrative embodiment of the present invention. The system 900 includes an input system 905, a process system 910, and an output system 915. The input system 905 collects information of model relationships 930, data for system configuration 935, and data from sensors 940, which is processed by the process system 910 to output computer generated leak scenarios 950 and inventory loss outputs 955 from the output system 915.

Figure 10A:
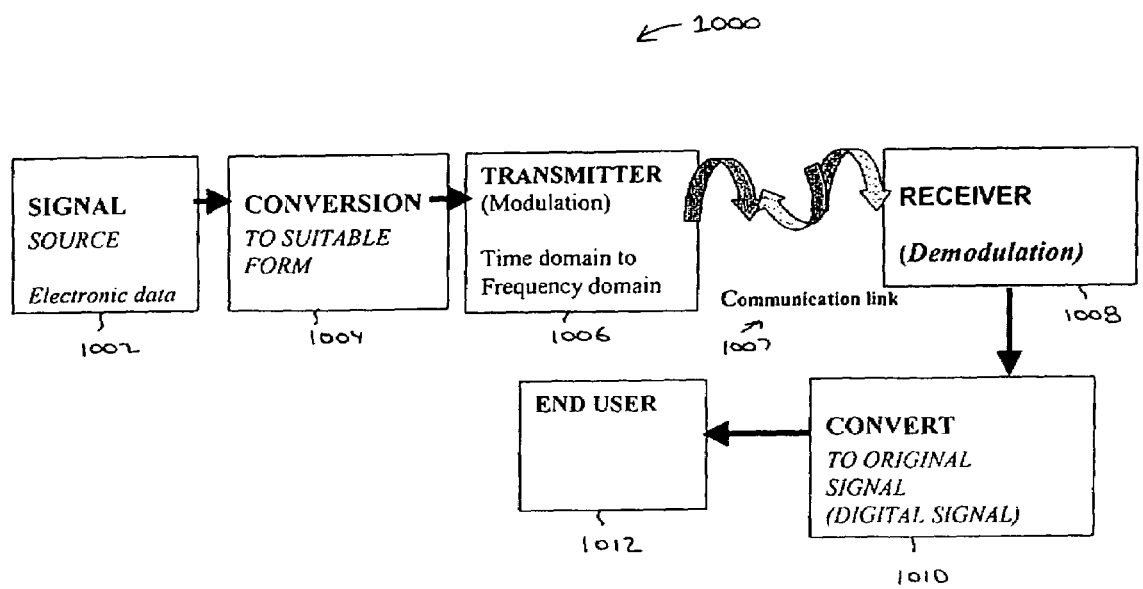
FIG. 10A is a diagram illustrating a signal path 1000 for a leak detection system, according to an illustrative embodiment of the present invention.

FIG. 10A is a diagram illustrating a signal path 1000 for a leak detection system, according to an illustrative embodiment of the present invention. Electronic data is transmitted from the data/signal source 1002 to a conversion module 1004 where the data is converted into a suitable form (digital signal). The converted data is then sent to a transmitter 1006 wherein the converted data is modulated (time domain to frequency domain) and transmitted via a communication link 1007.

The transmitted data is received by a receiver 1008, where it is demodulated (frequency domain to time domain). The received data is then converted, by another conversion module 1010, to an original signal (digital signal) for the end user 1012. The signal path is encrypted to enhance the security of the data.

Figure 10B:
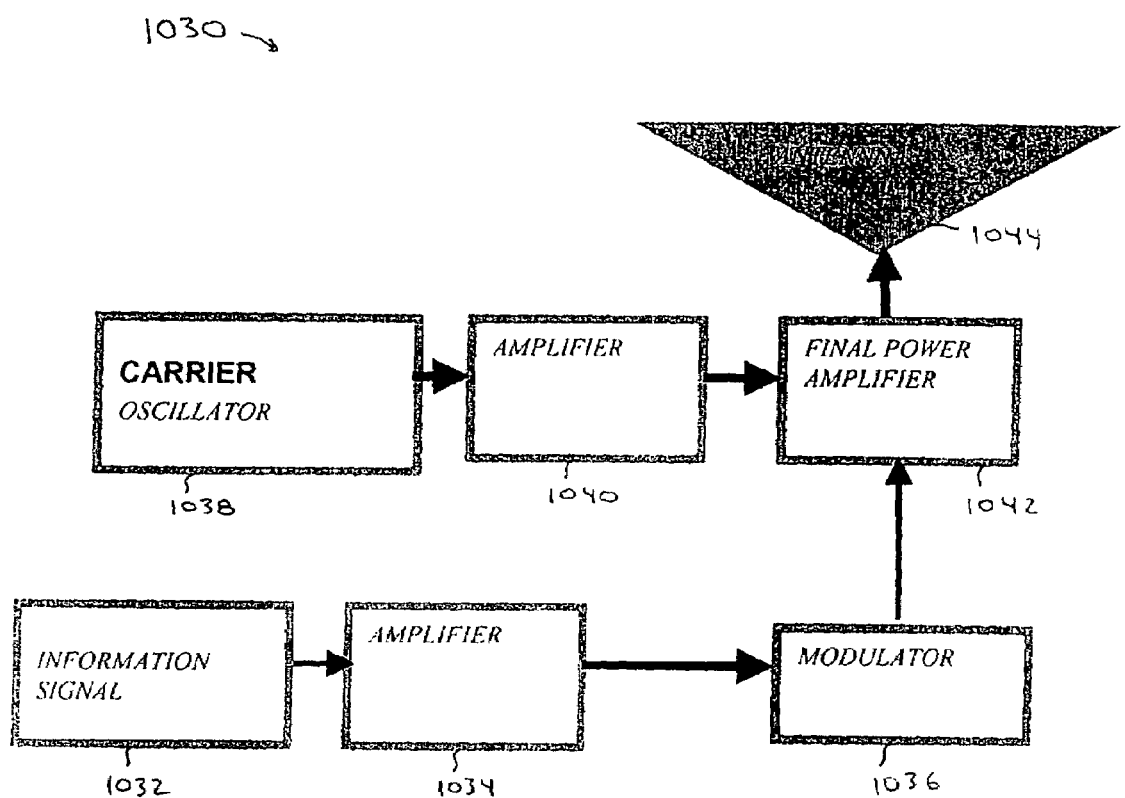
FIG. 10B is a diagram illustrating a transmitter 1030 for a leak detection system, according to an illustrative embodiment of the present invention.

FIG. 10B is a diagram illustrating a transmitter 1030 for a leak detection system, according to an illustrative embodiment of the present invention. The transmitter 1030 employs high-level modulation. An information signal 1032 to be modulated is input to an amplifier 1034 for amplification and then to modulator 1036 for modulation. An oscillator 1038 provides a carrier signal that is input to another amplifier 1040. The outputs of the amplifier 1034 and the other amplifier 1040 are input to a final power amplifier 1042 and then wirelessly transmitted by an antenna 1044.

Figure 10C:
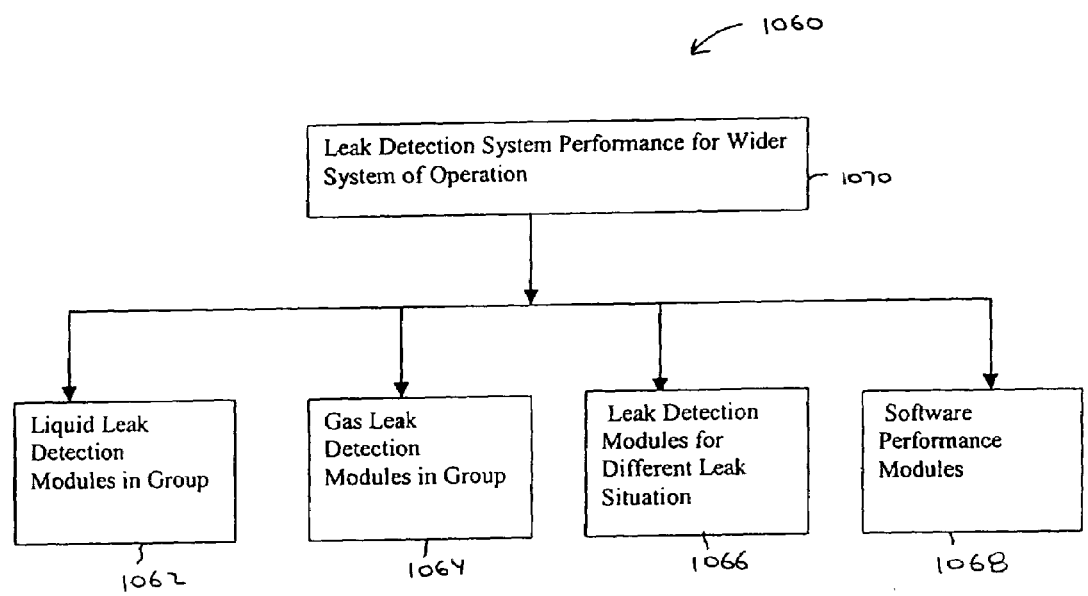
FIG. 10C is a diagram illustrating subsystem modules 1060 for a leak detection system, according to an illustrative embodiment of the present invention.

FIG. 10C is a diagram illustrating subsystem modules 1060 for a leak detection system, according to an illustrative embodiment of the present invention. The diagram represents all of the leak detection subsystem modules for liquid 1062, gas 1064 and other process leak detection modules 1066 (including, but not limited to, storage tanks, blood vessels systems, and so forth), combined with software performance modules 1068, so as encompass leak detection system performance for a wider system of operation 1070.

Figure 11:
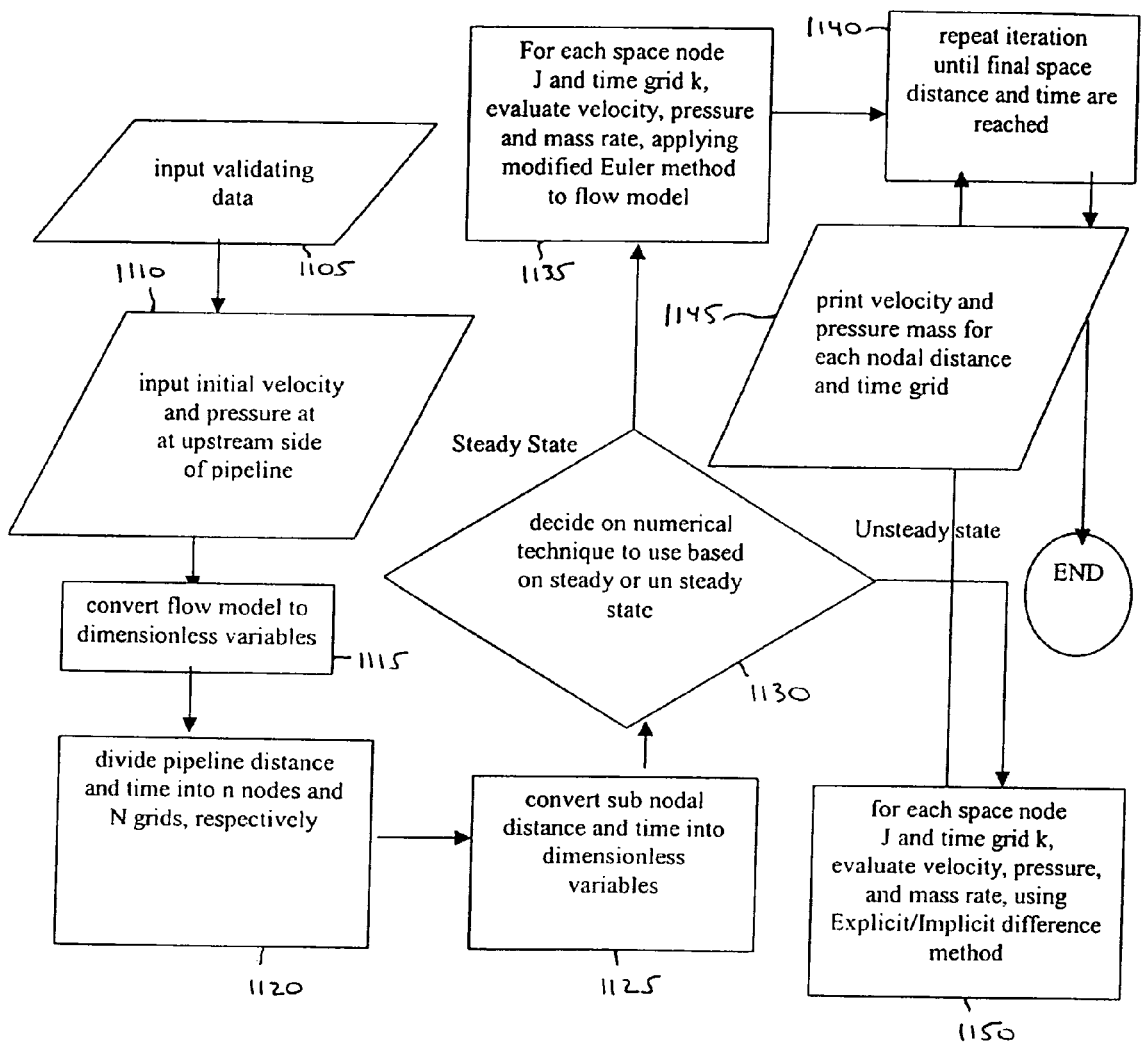
FIG. 11 is a flow simulation information diagram for determining flow velocity and pressure in a typical pipeline segment, according to an illustrative embodiment of the present invention.

FIG. 11 is a flow simulation information diagram for determining flow velocity and pressure in a typical pipeline segment, according to an illustrative embodiment of the present invention.

Validating data is input (step 1105). Initial velocity and pressure at the upstream side of the pipeline segment are input (step 1110). A flow model of the pipeline segment is converted to dimensionless variables (step 1115). The pipeline distance and time are divided into n nodes and N grids, respectively (step 1120). The sub nodal distance and time are converted into dimensionless variables (step 1125). The numerical technique to be used is decided, based on a steady state or an unsteady state of the pipeline segment (step 1130). For the steady state, steps 1135, 1140, 1145, and 1150 are performed. For the unsteady state, steps 1150, 1140, and 1145 are performed.

At step 1135, for each space node J and time grid K, velocity, pressure, and mass rate are evaluated by applying a modified Euler method to the flow model of the pipeline segment. The iteration is repeated until the final space distance and time are reached (step 1140). The velocity, pressure, and mass rate are printed, for each nodal distance and time grid (step 1145).

At step 1150, for each space node J and time grid K, velocity, pressure, and mass rate are evaluated using an explicit/implicit difference method.

Figure 12A:
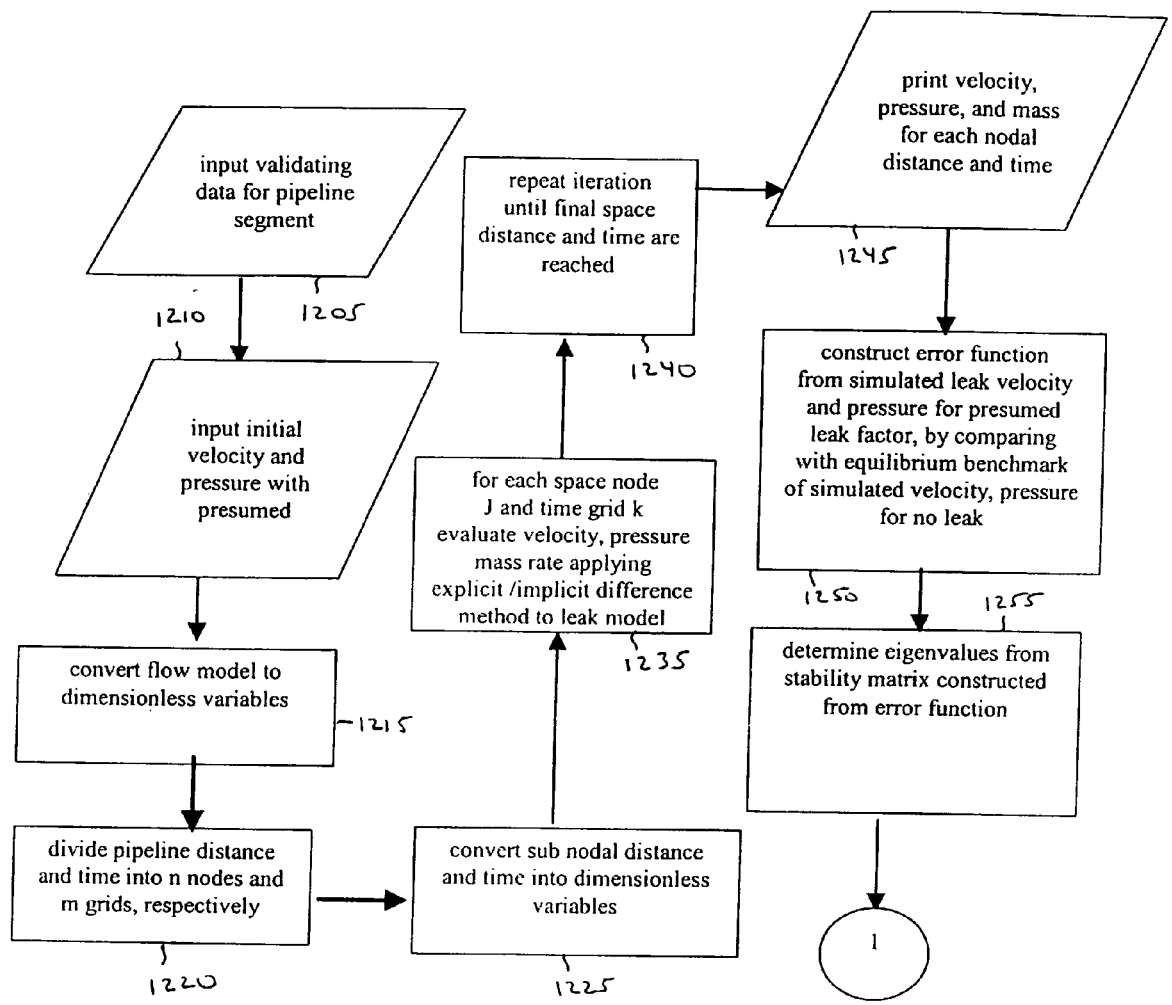
FIGS. 12A and 12B form a leak simulation information diagram for detecting and locating leaks in a typical pipeline segment, according to an illustrative embodiment of the present invention.
Figure 12B:
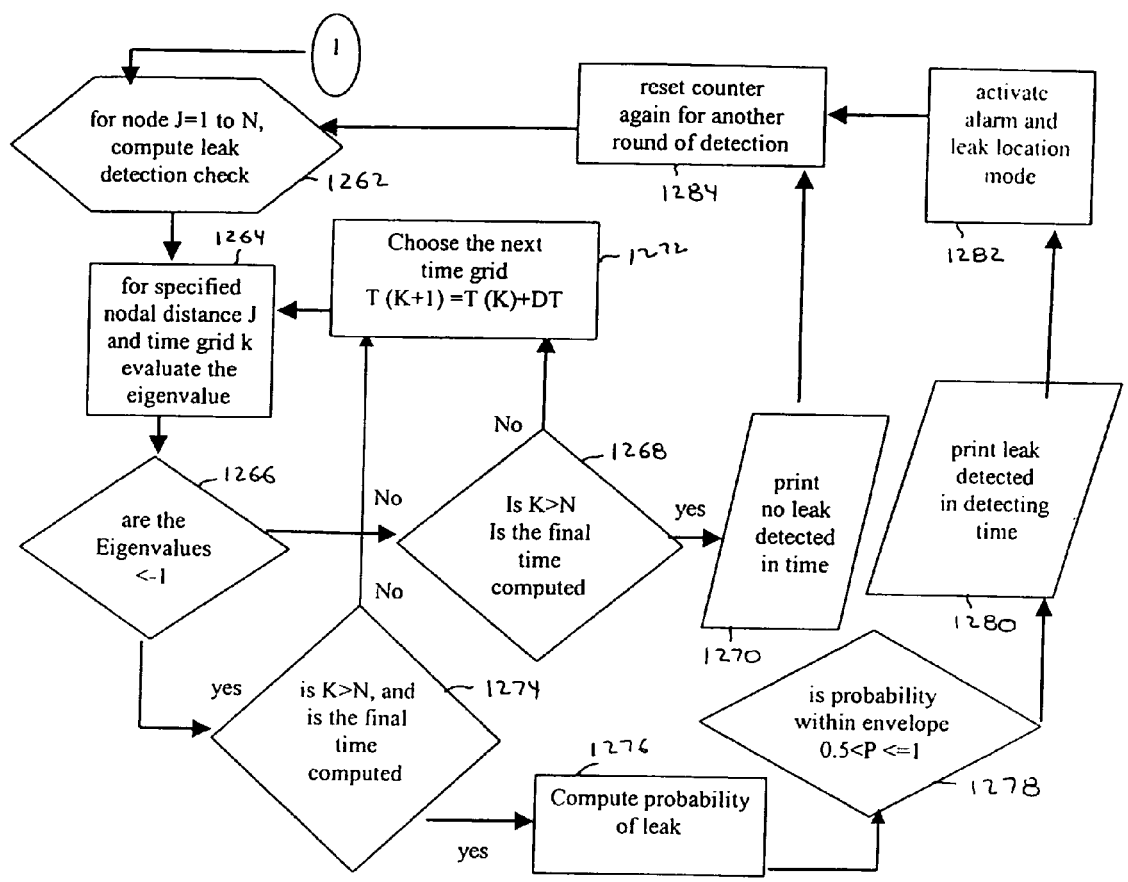

FIGS. 12A and 12B form a leak simulation information diagram for detecting and locating leaks in a typical pipeline segment, according to an illustrative embodiment of the present invention.

Validating data is input for the pipeline segment (step 1205). Initial velocity and pressure with a presumed leak factor $k_L$ at the upstream side of the pipeline segment are input (step 1210). A flow model of the pipeline segment is converted to dimensionless variables (step 1215). The pipeline distance and time are divided into n nodes and m grids, respectively (step 1220). Sub nodal distance and time are converted into dimensionless variables (step 1225).

For each space node J and time grid k, velocity, pressure, and mass rate are evaluated by applying an explicit/implicit difference method to a leak model (step 1235). The iteration is repeated until the final space distance and time are reached (step 1240). The velocity, pressure, and mass rate are printed, for each nodal distance and time grid (step 1245).

An error function is constructed from the simulated leak velocity and pressure for the presumed leak factor $k_L$, by comparing against an equilibrium benchmark of simulated velocity and pressure for a no leak condition (step 1250). Eigenvalues are determined from the stability matrix that was constructed from the error function (step 1255).

For node J=1 to N, a leak detection check is computed (step 1262). For a specified nodal distance J and time grid K, evaluate the Eigenvalue (step 1264). It is then determined whether the eigenvalues are less than −1 (step 1266). If so, the method proceeds to step 1274. Otherwise, the method proceeds to step 1268.

At step 1274, it is determined whether K>N. If so, then the method proceeds to step 1276. Otherwise, the method proceeds to step 1272.

At step 1276, the probability P of a leak is computed. It is then determined whether the probability P is within the following envelope: 0.5<P<=1 (step 1278). If so, then the method proceeds to step 1280. Otherwise, the method proceeds along another route.

At step 1268, it is determined whether K>N. If so, then the method proceeds to step 1270. Otherwise, the method proceeds to step 1272.

At step 1270, "no leak detected in time" is printed, then the method proceeds to step 1284 to reset the counter for another round of detection (step 1284), and the method returns to step 1262.

At step 1272, the next time grid T (K+1)=T (K)+DT is chosen, and the method returns to step 1264.

At step 1280, "leak detected in detecting time" is printed, and the method proceeds to step 1282 to activate an alarm and leak location mode, and then the method further proceeds to step 1284 to reset the counter for another round of detection before returning to step 1262.

Figure 13:
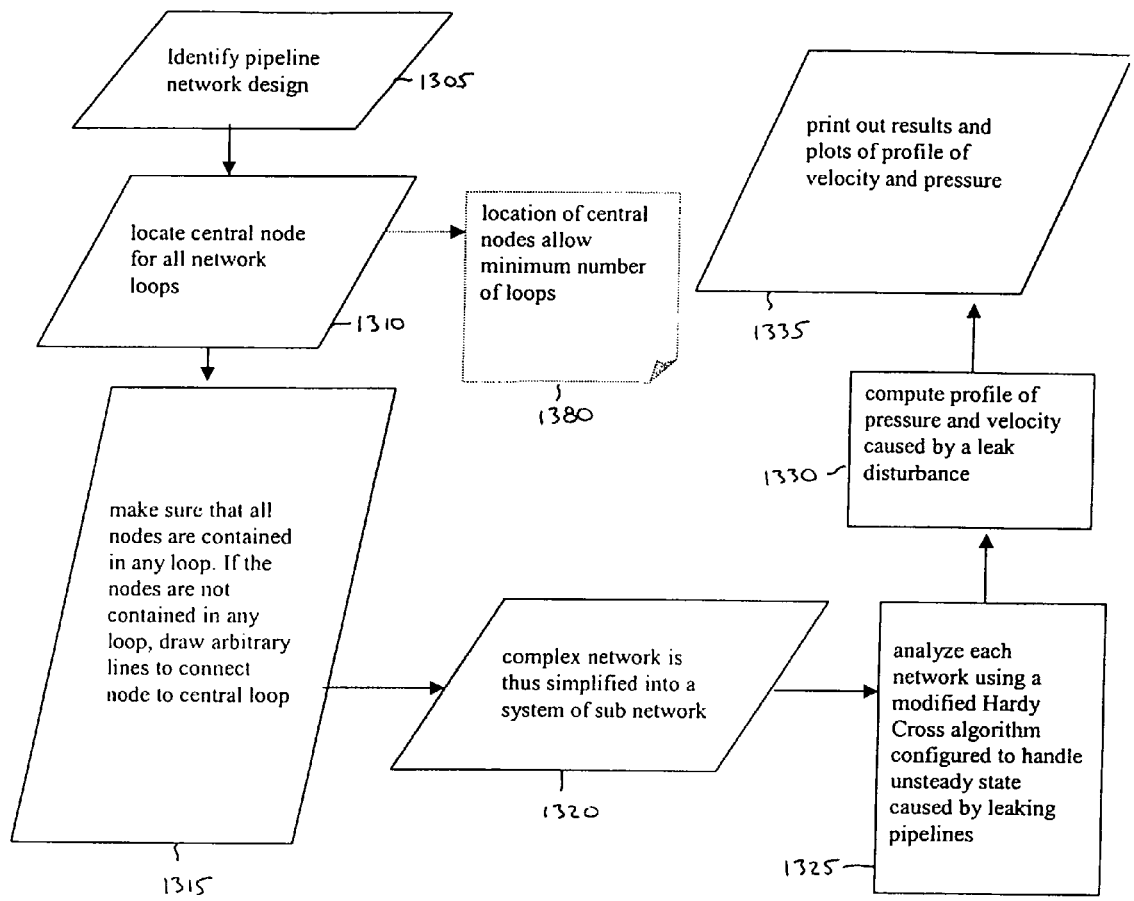
FIG. 13 is a pipeline network analysis information flow diagram for analyzing a complex pipeline network system, according to an illustrative embodiment of the present invention.

FIG. 13 is a pipeline network analysis information flow diagram for analyzing a complex pipeline network system, according to an illustrative embodiment of the present invention.

The pipeline network design under consideration is identified (step 1305). The central node from which all network loops can be generated is located (step 1310). It is to be appreciated that the location of the central node allows for the minimum number of loops in the simplified system referred to below at step 1320 (1380). It is then ensured that all of the nodes are contained in any one of the loops that are included in the minimum number of loops identified at step 1380 (step 1315). If not, then step 1315 includes the step of drawing arbitrary lines to connect uncontained nodes to the central node.

The complex network is thus simplified into a system of sub networks (1320). Each of the sub networks is analyzed using a modified Hardy Cross algorithm configured to handle unsteady states caused by leaking pipelines (step 1325). A profile of pressure and velocity caused by a leak disturbance is computed (step 1330). The results of the profile of step 1330 are printed out (step 1335).

Figure 14A:
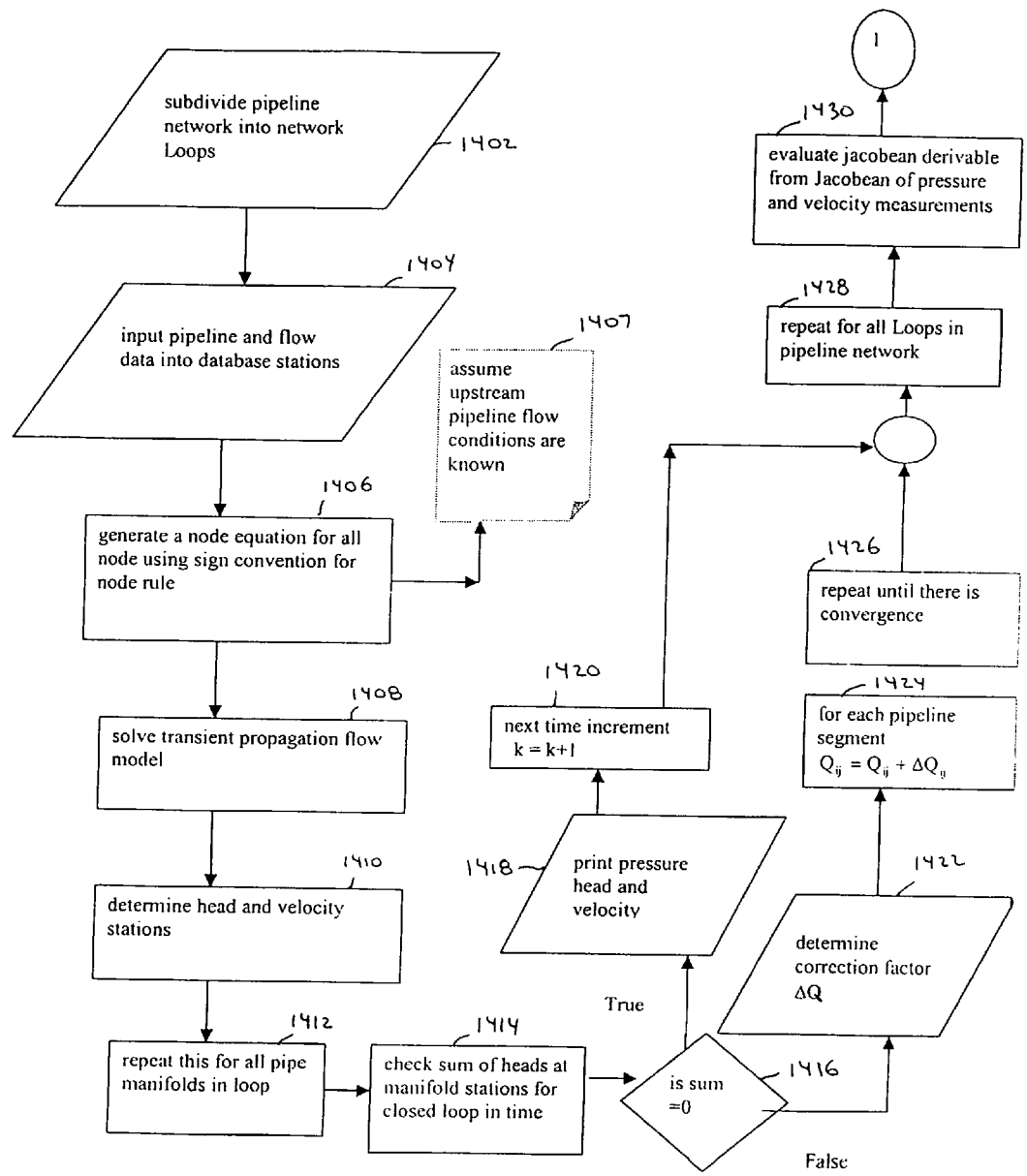
FIGS. 14A and 14B are leak detection/flow simulation diagrams for a complex pipeline network system, according to an illustrative embodiment of the present invention.
Figure 14B:
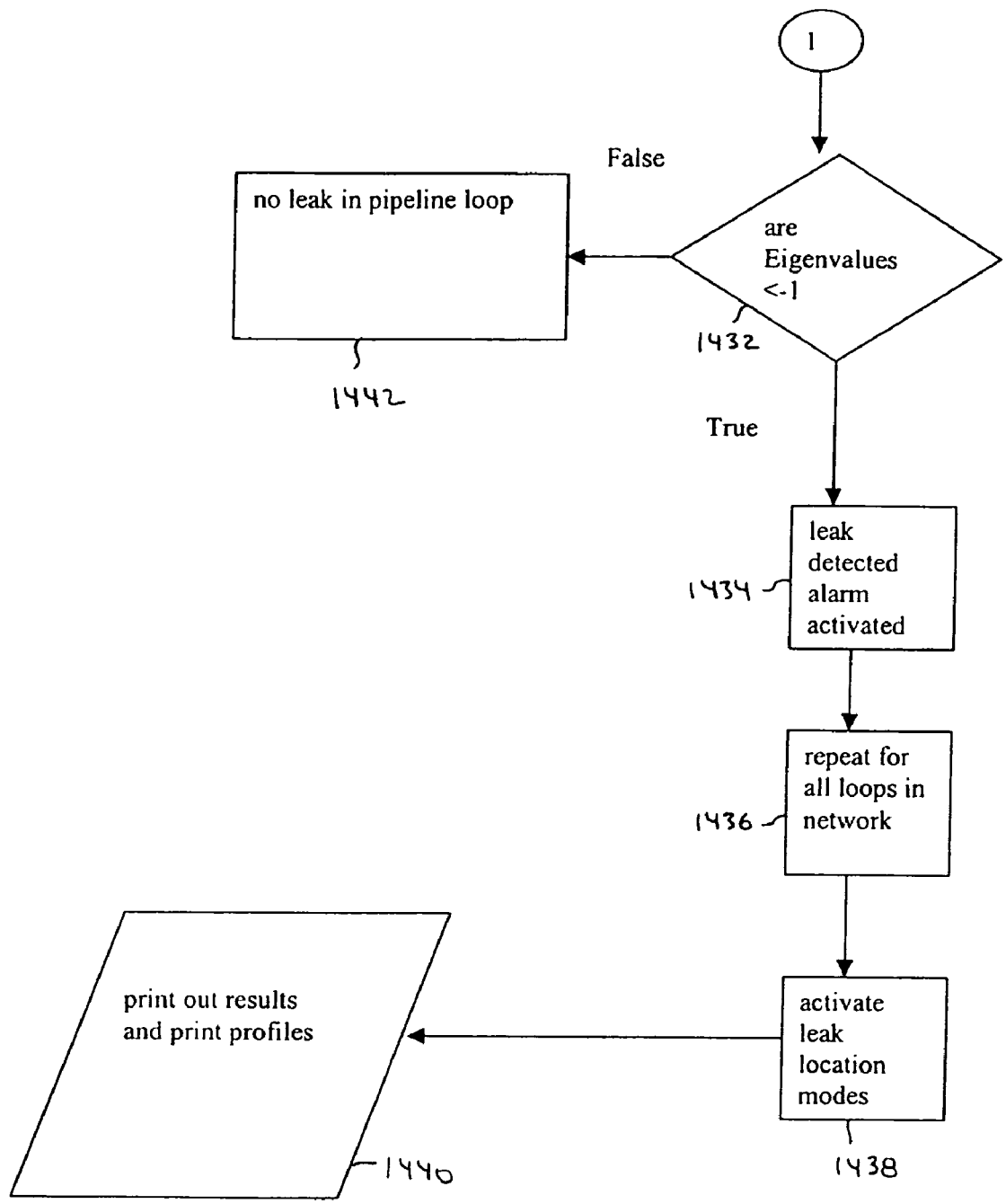

FIG. 14 is a leak detection/flow simulation diagram for a complex pipeline network system, according to an illustrative embodiment of the present invention;

The complex pipeline network is divided into network loops (step 1402). Ensure that all pipes are included in at least one of the network loops when performing step 1402. Pipeline and flow data are input into a database (step 1404). A node equation is generated for each node using a sign convention for a node rule (step 1406). It is presumed that upstream pipeline flow conditions are known (1407).

A transient propagation flow model is solved for each pipe section in the pipeline loop for velocity and pressure at sub nodes within the pipe section (step 1408).

Head and velocity are determined at the downstream manifold stations (step 1410). Step 1410 is repeated for all pipe manifolds in all loops (step 1412). Once all of the manifold stations in the loop are evaluated, the sum of the heads at the manifold station for a closed loop for that particular time is checked (step 1414). It is then determined whether the sum is equal to zero (step 1416). If so, then the method proceeds to step 1418. Otherwise, the method proceeds to step 1422.

At step 1418, the pressure head and the velocity are printed out, the method proceeds to step 1420 to increment k by 1 (i.e., k=k+1) so as to move to the next time step, and then the method proceeds to step 1428.

At step 1422, the correction factor ▰Q is determined.

$$\Delta Q_i = -\frac{\sum_{J=1}^{J} K_{iJ} Q_{IJ}^0 |Q_{IJ}^0|^{\alpha-1}}{n \sum_{J=1}^{J} K_{IJ} |Q_{IJ}^0|^{\alpha-1}} \quad (17)$$

where j is the jth line in the $i^{th}$ loop.

After obtained ▰Q for each loop, then for each pipeline segment, a new value for the flow rate in each line is computed as follows: $Q_{ij}=Q_{ij}+▰Q_{ij}$ (step 1424). These steps are repeated until there is convergence (step 1426), and then the method proceeds to step 1428.

At step 1428, steps 1402 through 1426 are repeated for all loops in the pipeline network. The Jacobean derivable from the Jacobean of pressure and velocity measurements is evaluated (step 1430). That is, after the velocity and pressure are determined for each transient state, the leak characteristics are investigated for a leak factor between, e.g., 0 and 10, and a characteristic deviation matrix equation is developed.

It is then determined whether the Eigenvalues of the characteristic deviation matrix equation are less than −1 for all process time (step 1432). If so, the method proceeds to step 1434. Otherwise, the method proceeds to step 1442.

At step 1434, a "leak detected" alarm is activated. These steps are repeated for all loops in the pipeline network to, e.g., study feedback characteristics (step 1436). Leak location modes are activated (step 1438). A leak is located once the wave velocity particular to the leak evaluated. This is determined by the product of the wave velocity and the instantaneous time for leak detection. Also, through a back simulation, the least gradient curve corresponding to the position of the leak is extrapolated. Inventory loss is evaluated by the difference in input flow and output flow, corrected for thresholds. The results and profiles are printed out (step 1440).

At step 1442, it is ascertained that there is no leak in the pipeline loop.

Figure 15:
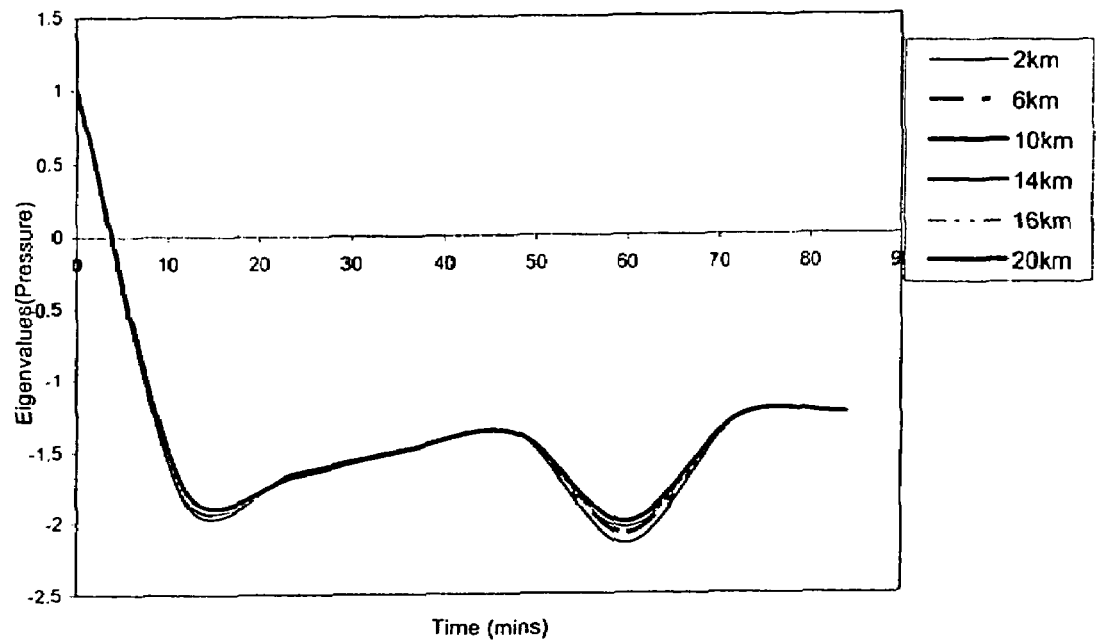
FIG. 15 is a plot of characteristic Eigenvalue Pressure versus time and distance, for a studied pipeline segment (M/E–M/F) and a small leak factor $k_L=1.5$, according to a simulation result corresponding to an illustrative embodiment of the present invention.

FIG. 15 is a plot of characteristic Eigenvalue Pressure versus time and distance, for a studied pipeline segment (M/E–M/F) and a small leak factor $k_L$=1.5, according to a simulation result corresponding to an illustrative embodiment of the present invention.

Figure 16:
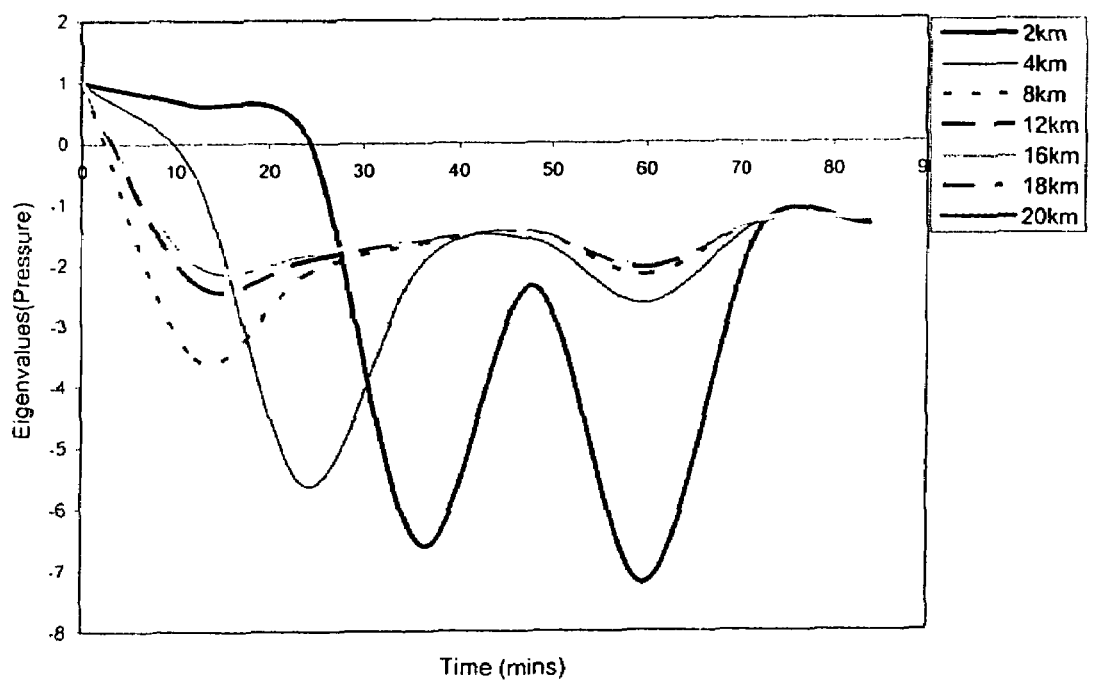
FIG. 16 is a plot of characteristic Eigenvalue Pressure versus time and distance, for a studied pipeline segment (M/E–M/F) and a large leak factor $k_L=3.0$, according to a simulation result corresponding to an illustrative embodiment of the present invention.

FIG. 16 is a plot of characteristic Eigenvalue Pressure versus time and distance, for a studied pipeline segment (M/E–M/F) and a large leak factor $k_L$=3.0, according to a simulation result corresponding to an illustrative embodiment of the present invention.

Figure 17:
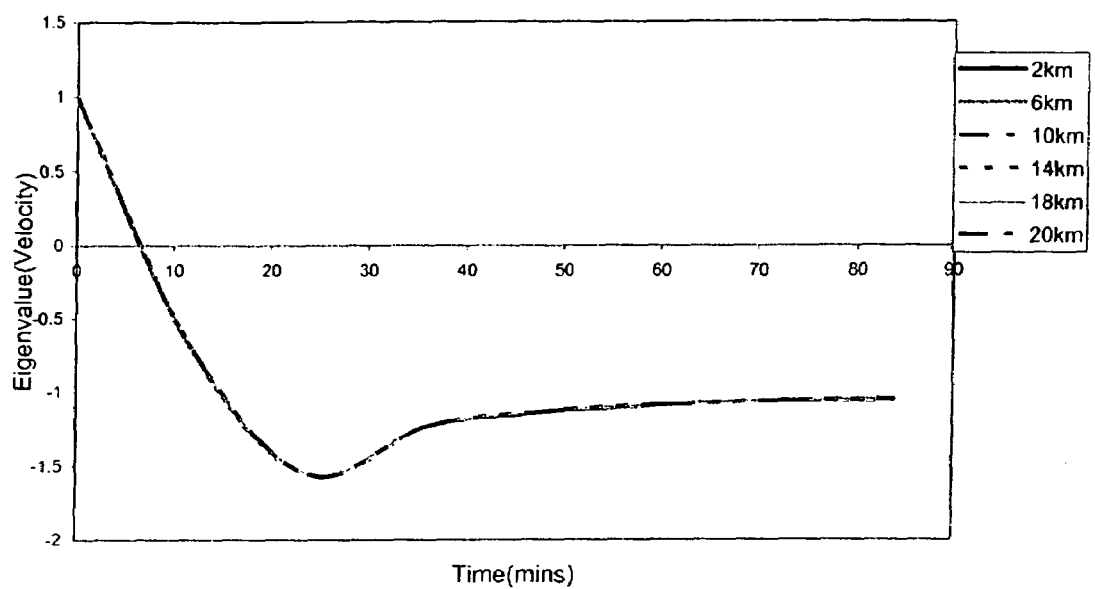
FIG. 17 is a plot of characteristic Eigenvalue Velocity versus time and distance, for a studied pipeline segment (M/E–M/F) and a small leak factor $k_L=1.5$, according to a simulation result corresponding to an illustrative embodiment of the present invention.

FIG. 17 is a plot of characteristic Eigenvalue Velocity versus time and distance, for a studied pipeline segment (ME–M/F) and a small leak factor $k_L$=1.5, according to a simulation result corresponding to an illustrative embodiment of the present invention.

Figure 18:
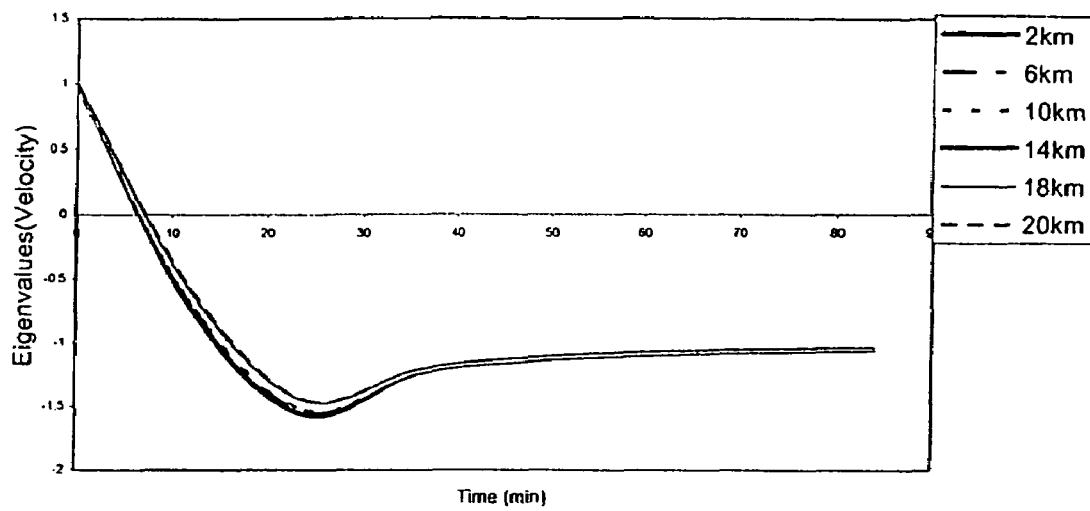
FIG. 18 is a plot of characteristic Eigenvalue Velocity versus time and distance, for a studied pipeline segment (M/E–M/F) and a large leak factor $k_L=3.0$, according to a simulation result corresponding to an illustrative embodiment of the present invention.

FIG. 18 is a plot of characteristic Eigenvalue Velocity versus time and distance, for a studied pipeline segment (M/E–M/F) and a large leak factor $k_L$=3.0, according to a simulation result corresponding to an illustrative embodiment of the present invention.

Figure 19:
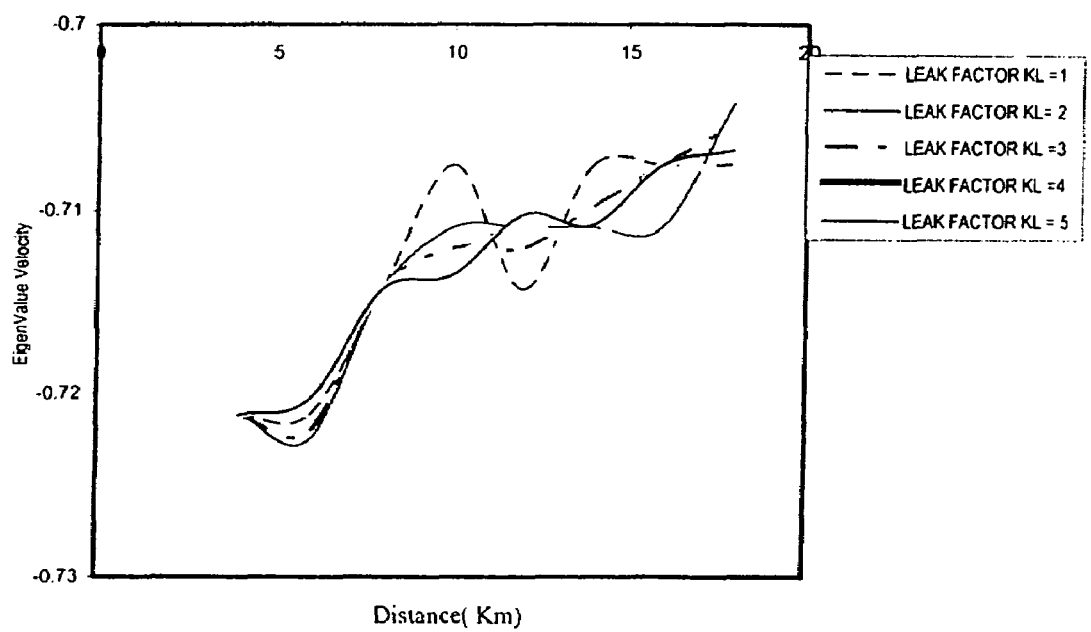
FIG. 19 is a plot of Eigenvalue Velocity versus pipeline distance, for a studied pipeline segment (M/E–M/F) and different leak factors $k_L=1, 2, 3, 4,$ and $5$ at a simulation time of 24s, according to a simulation result corresponding to an illustrative embodiment of the present invention.

FIG. 19 is a plot of Eigenvalue Velocity versus pipeline distance, for a studied pipeline segment (M/E–M/F) and different leak factors $k_L$=1, 2, 3, 4, and 5 at a simulation time of 24s, according to a simulation result corresponding to an illustrative embodiment of the present invention.

Figure 20:
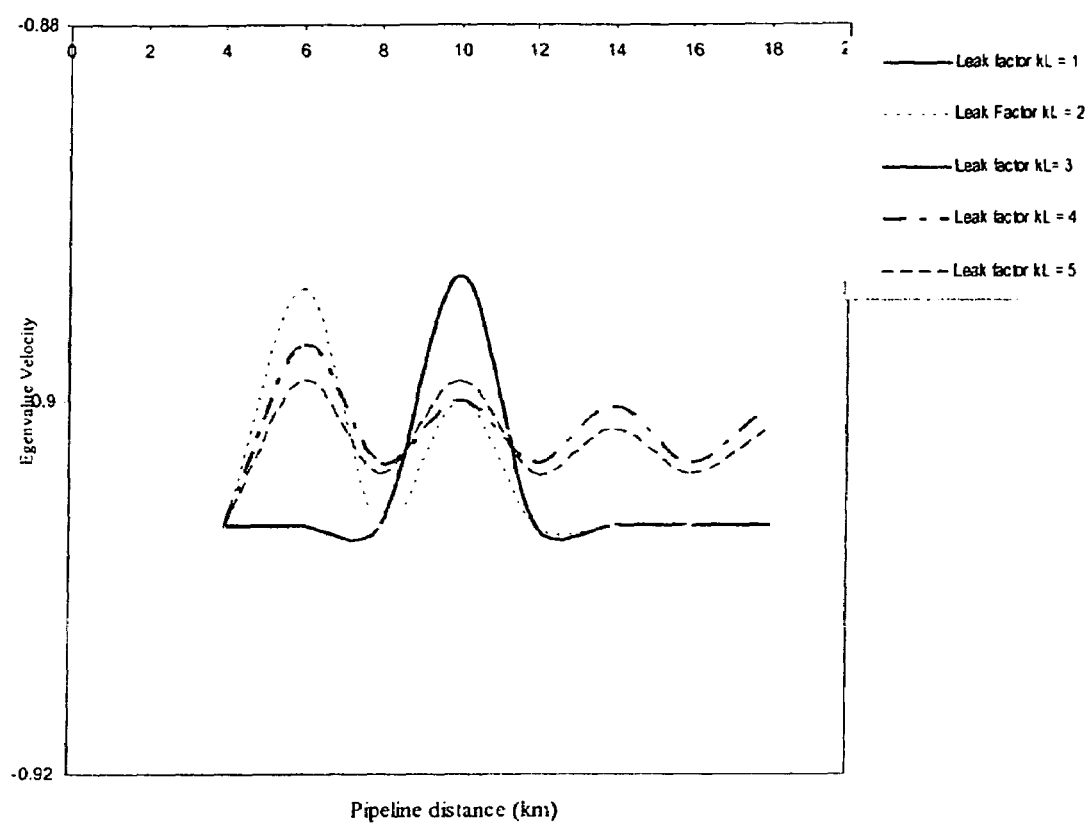
FIG. 20 is a plot of Eigenvalue velocity versus pipeline distance, for a studied pipeline segment (M/E–M/F) and different leak factors $k_L=1, 2, 3, 4,$ and $5$ at a simulation time of 48s, according to a simulation result corresponding to an illustrative embodiment of the present invention.
Figure 21:
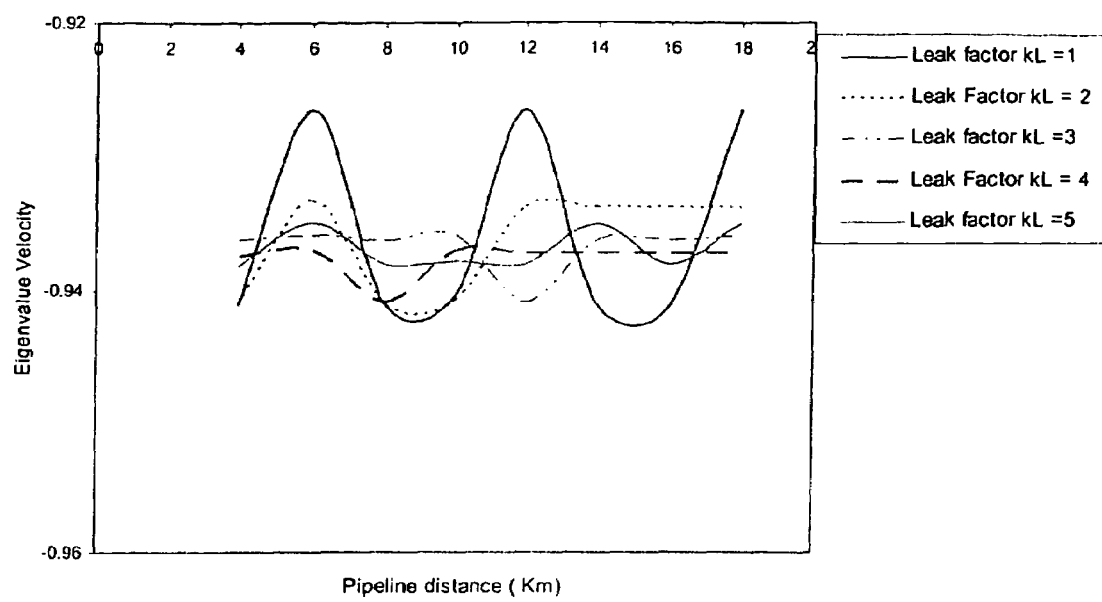
FIG. 21 is a plot of Eigenvalue velocity versus pipeline distance, for a studied pipeline segment (M/E–M/F) and different leak factors $k_L$=1, 2, 3, 4, and 5 at a simulation time of 72s, according to a simulation result corresponding to an illustrative embodiment of the present invention.

FIG. 20 is a plot of Eigenvalue velocity versus pipeline distance, for a studied pipeline segment (M/E–M/F) and different leak factors $k_L$=1, 2, 3, 4, and 5 at a simulation time of 48s, according to a simulation result corresponding to an illustrative embodiment of the present invention, FIG. 21 is a plot of Eigenvalue velocity versus pipeline distance, for a studied pipeline segment (M/E–M/F) and different leak factors $k_L$=1, 2, 3, 4, and 5 at a simulation time of 72s, according to a simulation result corresponding to an illustrative embodiment of the present invention.

Figure 22:
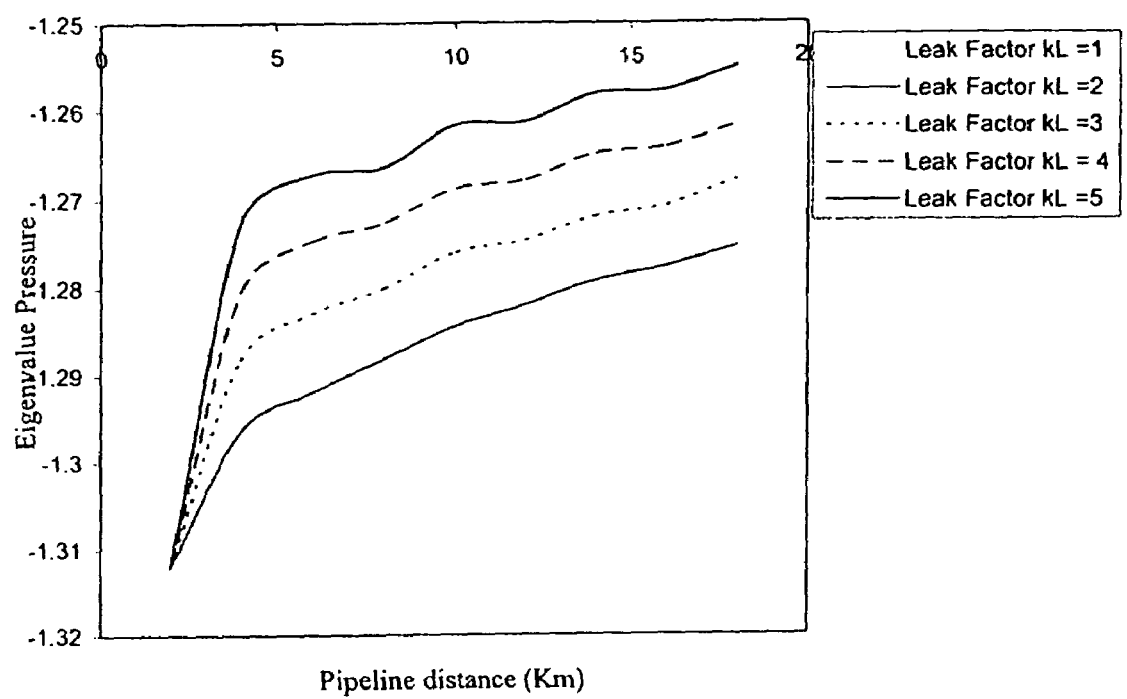
FIG. 22 is a plot of Eigenvalue Pressure versus pipeline distance, for a studied pipeline segment (M/E–M/F) and different leak factors $k_L$=1, 2, 3, 4, and 5 at a simulation time of 24s, according to a simulation result corresponding to an illustrative embodiment of the present invention.

FIG. 22 is a plot of Eigenvalue Pressure versus pipeline distance, for a studied pipeline segment (M/E–M/F) and different leak factors $k_L$=1, 2, 3, 4, and 5 at a simulation time of 24s, according to a simulation result corresponding to an illustrative embodiment of the present invention.

Figure 23:
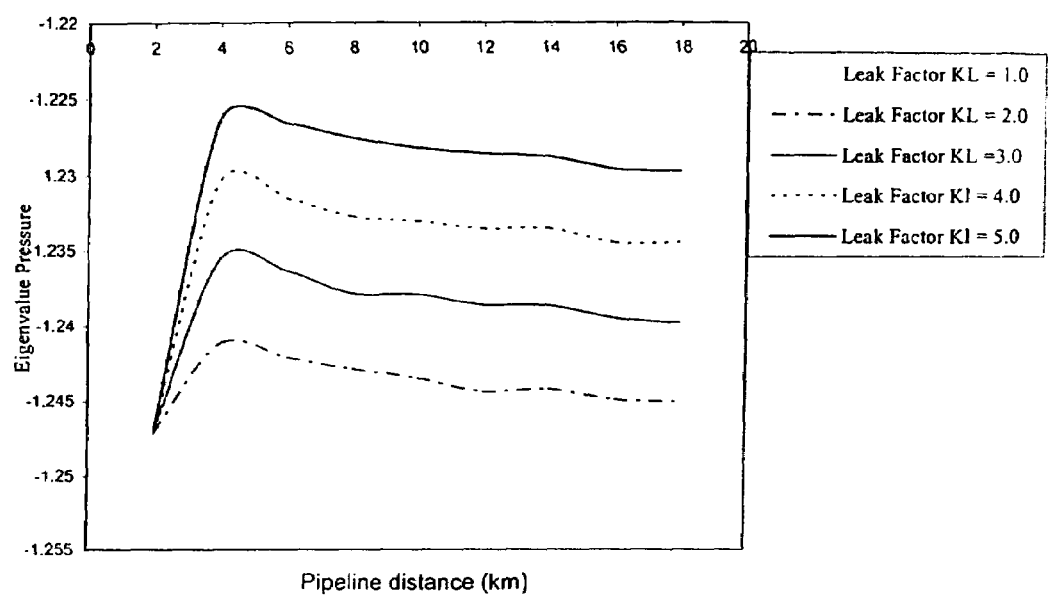
FIG. 23 is a plot of Eigenvalue Pressure versus pipeline distance, for a studied pipeline segment (M/E–M/F) and different leak factors $k_L$=1, 2, 3, 4, and 5 at a simulation time of 48s, according to a simulation result corresponding to an illustrative embodiment of the present invention.

FIG. 23 is a plot of Eigenvalue Pressure versus pipeline distance, for a studied pipeline segment (M/E–M/F) and different leak factors $k_L$=1, 2, 3, 4, and 5 at a simulation time of 48s, according to a simulation result corresponding to an illustrative embodiment of the present invention.

Figure 24:
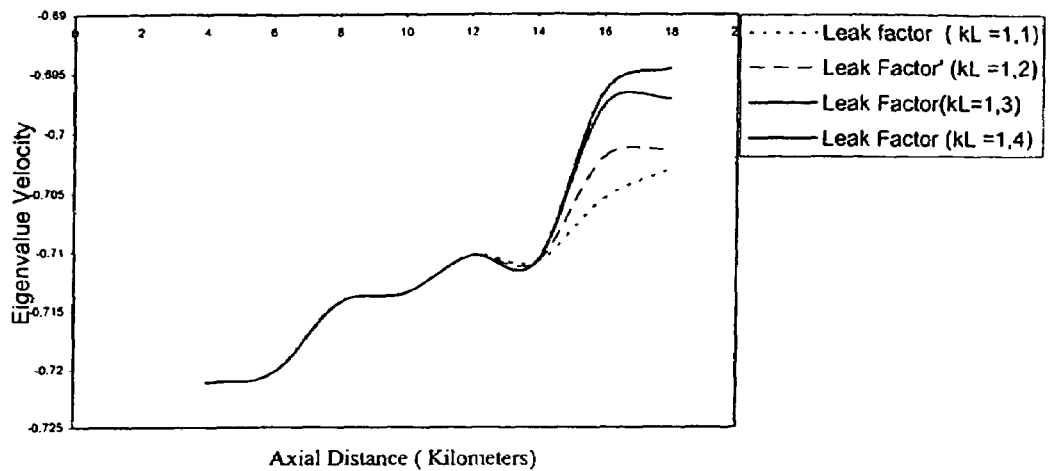
FIG. 24 is a plot of Eigenvalue Velocity versus axial distance, for a studied pipeline segment and a leak factor $k_L$=1 at 1 km from an upstream side of the pipeline segment, and different leak factors $k_L$=1, 2, 3, 4, and 5 at 1 km from a downstream side of the pipeline segment, at a simulation time of 24s, according to a simulation result corresponding to an illustrative embodiment of the present invention.

FIG. 24 is a plot of Eigenvalue Velocity versus axial distance, for a studied pipeline segment and a leak factor $k_L$=1 at 1 km from an upstream side of the pipeline segment, and different leak factors $k_L$=1, 2, 3, 4, and 5 at 1 km from a downstream side of the pipeline segment, at a simulation time of 24s, according to a simulation result corresponding to an illustrative embodiment of the present invention.

Figure 25:
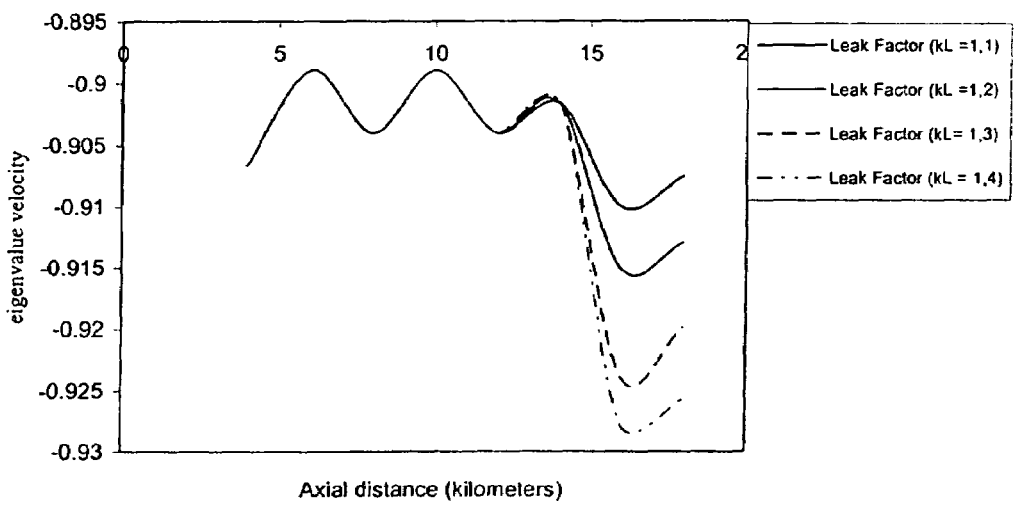
FIG. 25 is a plot of Eigenvalue Velocity versus axial distance, for a studied pipeline segment and a leak factor $k_L$=1 at 1 km from an upstream side of the pipeline segment, and different leak factors $k_L$=1, 2, 3, 4, and 5 at 1 km from a downstream side of the pipeline segment, at a simulation time of 48s, according to a simulation result corresponding to an illustrative embodiment of the present invention.

FIG. 25 is a plot of Eigenvalue Velocity versus axial distance, for a studied pipeline segment and a leak factor $k_L$=1 at 1 km from an upstream side of the pipeline segment, and different leak factors $k_L$=1, 2, 3, 4, and 5 at 1 km from a downstream side of the pipeline segment, at a simulation time of 48s, according to a simulation result corresponding to an illustrative embodiment of the present invention.

Figure 26:
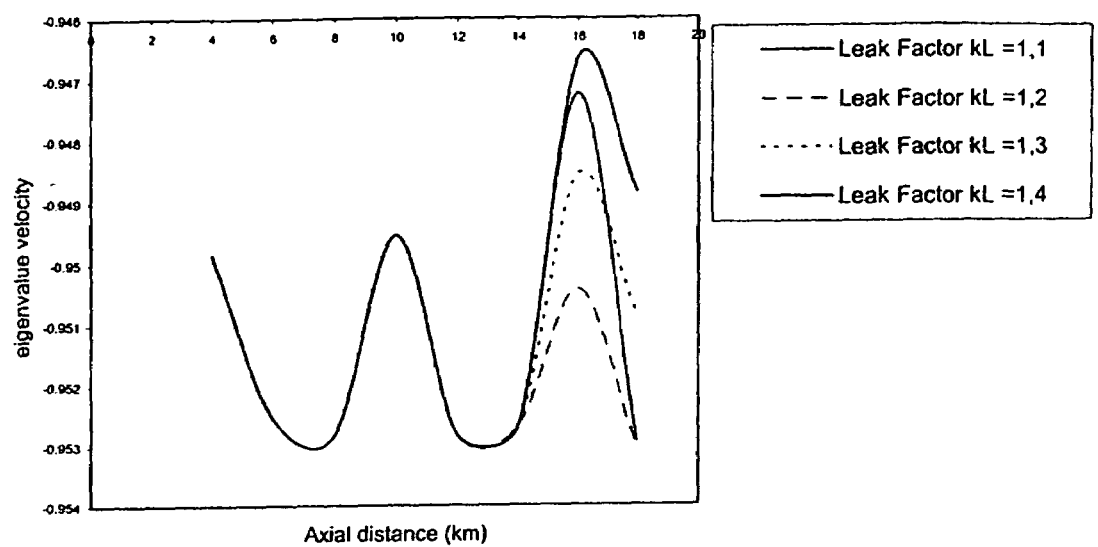
FIG. 26 is a plot of Eigenvalue Velocity versus axial distance, for a studied pipeline segment and a leak factor $k_L$=1 at 1 km from an upstream side of the pipeline segment, and different leak factors $k_L$=1, 2, 3, and 4 at 1 km from a downstream side of the pipeline segment, at a simulation time of 96s, according to a simulation result corresponding to an illustrative embodiment of the present invention.

FIG. 26 is a plot of Eigenvalue Velocity versus axial distance, for a studied pipeline segment and a leak factor $k_L$=1 at 1 km from an upstream side of the pipeline segment, and different leak factors $k_L$=1, 2, 3, and 4 at 1 km from a downstream side of the pipeline segment, at a simulation time of 96s, according to a simulation result corresponding to an illustrative embodiment of the present invention.

Figure 27:
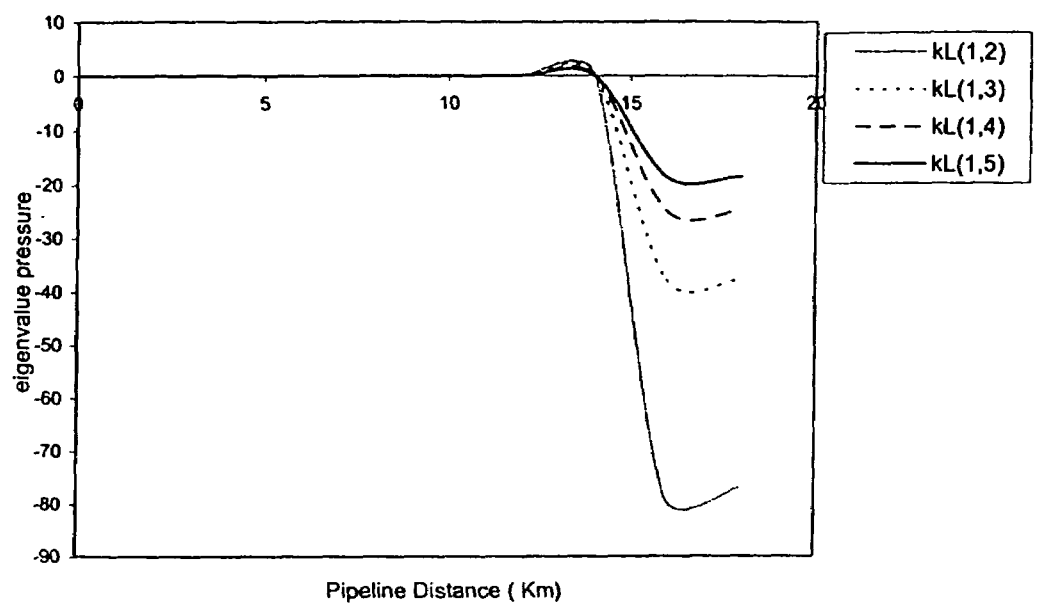
FIG. 27 is a plot of Eigenvalue Pressure versus pipeline distance, for a studied pipeline segment and a leak factor $k_L$=1 at 1 km from an upstream side of the pipeline segment, and different leak factors $k_L$=1, 2, 3, and 4 at 1 km from a downstream side of the pipeline segment, at a simulation time of 24s, according to a simulation result corresponding to an illustrative embodiment of the present invention.

FIG. 27 is a plot of Eigenvalue Pressure versus pipeline distance, for a studied pipeline segment and a leak factor $k_L$=1 at 1 km from an upstream side of the pipeline segment, and different leak factors $k_L$=1, 2, 3, and 4 at 1 km from a downstream side of the pipeline segment, at a simulation time of 24s, according to a simulation result corresponding to an illustrative embodiment of the present invention.

Figure 28:
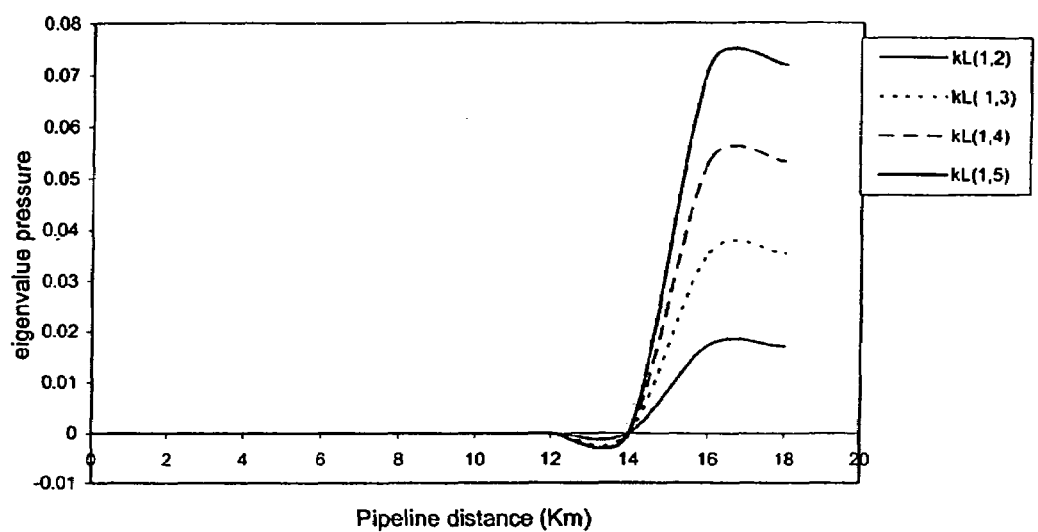
FIG. 28 is a plot of Eigenvalue Pressure versus pipeline distance, for a studied pipeline segment and a leak factor $k_L$=1 at 1 km from an upstream side of the pipeline segment, and different leak factors $k_L$=1, 2, 3, and 4 at 1 km from a downstream side of the pipeline segment, at a simulation time of 48s, according to a simulation result corresponding to an illustrative embodiment of the present invention.

FIG. 28 is a plot of Eigenvalue Pressure versus pipeline distance, for a studied pipeline segment and a leak factor $k_L$=1 at 1 km from an upstream side of the pipeline segment, and different leak factors $k_L$=1, 2, 3, and 4 at 1 km from a downstream side of the pipeline segment, at a simulation time of 48s, according to a simulation result corresponding to an illustrative embodiment of the present invention.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for detecting and locating leaks in a pipeline network in real-time, comprising the steps of:
providing a flow model that characterizes flow behavior for at least one of steady and unsteady states respectively corresponding to an absence and a presence of model leaks in the pipeline network, the flow model including a leaking factor $k_L$;
providing a deterministic model to evaluate at least one of a leak status and a no leak status relating to the pipeline network using deterministic criteria, the deterministic criteria being based on a Liapunov Stability Theory; and
constructing a deviation matrix based on the flow model and the deterministic model to generate eigenvalues, and generating a leak alarm when at least one of the eigenvalues is less than a predetermined value.

2. The method of claim 1, further comprising the step of providing a probability and statistical model based on a Bayesian Probability Model to construct a random table that certifies the presence of a detected leak, and wherein said generating step generates the leak alarm when the at least one of the eigenvalues is less than the predetermined value and the presence of the detected leak is certified.

3. The method of claim 2, wherein leak coordinates are located as points in z-coordinates in a curvilinear (rθz) cylindrical mesh grid.

4. The method of claim 1, further comprising the step of tracking leak locations using the deterministic model, fluid sonic velocity and a time lag between leak and no leak detection measurements.

5. The method of claim 1, further comprising the steps of, subsequent to said constructing step:
generating a standard deviation model for assigning a value and classifying a disturbance in the pipeline network;
calculating another standard deviation model to evaluate a width of deviation of a typical flow vector point at time i=0 . . . n;

$$SD(\lambda_{1ij}) = \sqrt{\sum_{i=0}^{n} \frac{(|\lambda_{1ij}|-1)^2}{(n-1)}}$$

$$SD(\lambda_{2ij}) = \sqrt{\sum_{i=0}^{n} \frac{(|\lambda_{2ij}|-1)^2}{(n-1)}}$$

$$SD(\lambda_{3ij}) = \sqrt{\sum_{i=0}^{n} \frac{(|\lambda_{3ij}|-1)^2}{(n-1)}}$$

wherein a standard deviation close to zero indicates a small leak, and as the standard deviation increases a larger leak is indicated, and wherein $|\lambda_{1ij}|, |\lambda_{2ij}|, |\lambda_{3ij}|$ respectively represent an absolute eigenvalue of velocity, mass and pressure at a particular time and pipeline node point.

6. The method of claim 1, wherein the pipeline network includes a plurality of pipelines, and the method further comprises the steps of:
decomposing the pipeline network into a mesh of networks; and
analyzing the mesh of networks using nodal analysis and Kirchoff's Laws by modifying Hardy Cross program codes for an unsteady state to analyze the plurality of pipelines for leaks.

7. The method of claim 1, wherein the pipeline network includes a plurality of pipelines, and the method further comprises the steps of:
identifying a plurality of loops and a plurality of nodes within the pipeline network;
locating, from among the plurality of nodes, a central node from which each of the plurality of loops emanates;
identifying, from among the plurality of loops, a minimum number of loops that are capable of being constructed from the central node;
determining if all of the plurality of nodes are included within any one loops from among the minimum number of loops;
respectively drawing arbitrary lines that connect a given one of the nodes to the central node, when the given one of the nodes is not included within the any one loops from among the minimum number of loops, the arbitrary lines and the minimum number of loops forming a plurality of sub-networks; and
analyzing each of the plurality of sub-networks,
wherein said analyzing step comprises generating a pressure and velocity profile for evaluating a pressure drop and leak profile with respect to the plurality of sub-networks, based on a Hardy Cross algorithm.

8. The method of claim 7, further comprising the steps of:
identifying a plurality of code coverage tasks for analyzing fluid flow in the unsteady states, using the Hardy Cross algorithm;
generating a persistent unique subprogram code for each of the plurality of code coverage tasks;
incorporating a coverage program task model for different fluid and network systems into a modified format of the persistent unique subprogram code for each of the plurality of code coverage tasks to produce an instrumented version of the Hardy Cross algorithm;
compiling and linking the instrumented version of the Hardy Cross algorithm into an executable program that identifies a new set of test cases from a plurality of test cases, the plurality of test cases to be run for code coverage data collection purposes of the plurality of code coverage tasks;
altering a code coverage database to accommodate the new set of test cases and at least one code coverage task that is one of new, modified and expanded;
clearing any code coverage data for the plurality of code coverage tasks from the code coverage database;
running the executable program with a test case from the new set of test cases and collecting code coverage data for the plurality of code coverage tasks, until all new test cases from the new set of test cases have been run; and
updating the code coverage database with the collected code coverage data for non-affected code coverage tasks in the code coverage database so as to eliminate a need to run all of the executable program.

9. The method of claim 8, wherein said step of generating the persistent unique subprogram code for each of the plurality of code coverage tasks comprises the step of generating a persistent unique name for each of the plurality of code coverage tasks by changing version indicators in code names of the plurality of code coverage tasks.

* * * * *